US012612956B2

(12) United States Patent
Kuhl et al.

(10) Patent No.: US 12,612,956 B2
(45) Date of Patent: Apr. 28, 2026

(54) DRIVEN CLUTCH FOR CONTINUOUSLY VARIABLE TRANSMISSION

(71) Applicant: Polaris Industries Inc., Medina, MN (US)

(72) Inventors: Amery Kuhl, North Branch, MN (US); Rory Lindeberg, Shafer, MN (US); Alix D. Bartel, Dryden (CA); Samuel Willenbring, Forest Lake, MN (US); Jacob Frank, Milltown, WI (US); Narender Bejawada, Charlotte, NC (US); Jeffrey Peterman, Stacy, MN (US); Liam Lafferty, Wyoming, MN (US); Tristin Leonard, Hugo, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 19/005,055

(22) Filed: Dec. 30, 2024

(65) Prior Publication Data

US 2025/0215959 A1 Jul. 3, 2025

Related U.S. Application Data

(60) Provisional application No. 63/616,940, filed on Jan. 2, 2024.

(51) Int. Cl.
*F16H 9/12* (2006.01)
*F16D 43/12* (2006.01)
(Continued)

(52) U.S. Cl.
CPC ............. *F16H 9/125* (2013.01); *F16D 43/12* (2013.01); *F16D 67/02* (2013.01); *F16H 9/18* (2013.01);
(Continued)

(58) Field of Classification Search
CPC . F16H 55/56; F16H 9/125; F16H 9/18; F16H 2057/02043; F16H 57/035;
(Continued)

(56) References Cited

U.S. PATENT DOCUMENTS 2,276,186 A * 3/1942 Getchell ............. F16H 61/6625
474/19
3,224,287 A * 12/1965 Werner ................... F16H 13/14
474/19

(Continued)

FOREIGN PATENT DOCUMENTS

JP 2005-291402 A 10/2005
JP 2009-180356 A 8/2009

OTHER PUBLICATIONS

Extended European Search Report for Application No. 24223751.9 mailed May 9, 2025.

*Primary Examiner* — Henry Y Liu
(74) *Attorney, Agent, or Firm* — Merchant & Gould P.C.

(57) ABSTRACT

A driven unit helix assembly for a continuously variable transmission including a roller sleeve, a helix, a spring, and a helix sleeve. The roller sleeve is configured to coupled to a movable sheave and axially translate along a post. A plurality of roller assemblies radially extend from the roller sleeve and travel within roller tracks of the helix, such that the roller sleeve and helix define coaxial components coupled an axial sliding engagement. The spring extends from a proximal end coupled to a proximal portion of the helix to a distal end configured to contact at least a portion of the distal portion of the movable sheave, thereby urging the movable sheave in the distal direction. The helix sleeve extends circumferentially around the helix and is configured to retain a fluid in the helix assembly.

20 Claims, 29 Drawing Sheets

(51) Int. Cl.

| | |
|---|---|
| *F16D 67/02* | (2006.01) |
| *F16H 9/18* | (2006.01) |
| *F16H 57/02* | (2012.01) |
| *F16H 57/035* | (2012.01) |
| *F16H 57/04* | (2010.01) |

(52) U.S. Cl.
CPC ....... *F16H 57/035* (2013.01); *F16H 57/0416* (2013.01); *F16H 57/0489* (2013.01); *F16D 2300/08* (2013.01); *F16H 2057/02043* (2013.01)

(58) Field of Classification Search
CPC ............. F16H 57/0416; F16H 57/0489; F16H 57/0464; F16H 57/031; F16D 43/12; F16D 67/02; F16D 2300/08
See application file for complete search history.

(56) References Cited

U.S. PATENT DOCUMENTS

| | | | | | |
|---|---|---|---|---|---|
| 3,616,706 | A | * | 11/1971 | Shimamoto | F16H 55/56 474/46 |
| 3,722,308 | A | * | 3/1973 | Steuer | F16H 55/56 474/46 |
| 5,516,333 | A | * | 5/1996 | Benson | F16H 55/56 192/93 A |
| 5,720,681 | A | * | 2/1998 | Benson | F16H 63/067 474/10 |
| 5,967,286 | A | * | 10/1999 | Hokanson | F16H 55/56 192/111.1 |
| 6,095,937 | A | * | 8/2000 | Aaen | F16H 61/66227 474/10 |
| 6,120,399 | A | * | 9/2000 | Okeson | F16H 55/56 474/14 |
| 6,149,540 | A | * | 11/2000 | Johnson | F16H 61/66227 474/46 |
| 6,270,436 | B1 | * | 8/2001 | Reik | F16H 9/14 474/8 |
| 6,502,479 | B1 | * | 1/2003 | Lee | F16H 55/563 474/11 |
| 6,569,043 | B2 | * | 5/2003 | Younggren | F16H 55/56 474/19 |
| 6,733,406 | B2 | * | 5/2004 | Kitai | F16H 55/56 474/14 |
| 6,743,129 | B1 | * | 6/2004 | Younggren | F16H 55/56 474/19 |
| 6,755,759 | B2 | * | 6/2004 | Blanchard | F16H 61/66272 474/37 |
| 6,837,353 | B2 | * | 1/2005 | Watt | F16H 55/56 192/93 A |
| 6,949,039 | B2 | * | 9/2005 | Labbe | F16H 61/66272 474/8 |
| 6,953,400 | B2 | * | 10/2005 | Kalies | F16H 55/56 474/19 |
| 7,037,226 | B2 | * | 5/2006 | Zulawski | F16H 55/56 474/19 |
| 7,081,057 | B2 | * | 7/2006 | Kalies | F16H 55/56 474/8 |
| 7,179,183 | B2 | * | 2/2007 | Borghi | F16H 55/56 474/19 |
| 7,204,771 | B2 | * | 4/2007 | Gu | F16H 9/18 474/19 |
| 7,674,197 | B2 | * | 3/2010 | Aitcin | F16H 61/66272 474/10 |
| 7,901,308 | B2 | * | 3/2011 | Binello | F16H 61/66272 474/10 |

| | | | | | |
|---|---|---|---|---|---|
| 7,927,241 | B2 | * | 4/2011 | Labbe | F16H 55/56 474/10 |
| 8,187,127 | B2 | * | 5/2012 | Ishida | F16H 55/56 474/33 |
| 8,272,981 | B2 | * | 9/2012 | Galletti | F16H 9/12 474/23 |
| 8,496,551 | B2 | * | 7/2013 | Mueller | F16H 7/02 474/17 |
| 8,894,520 | B2 | * | 11/2014 | Labbe | F16H 55/56 474/19 |
| 9,005,058 | B2 | * | 4/2015 | Ouchida | F16H 61/66272 474/19 |
| 9,228,644 | B2 | * | 1/2016 | Tsukamoto | F16H 9/18 |
| RE47,798 | E | * | 1/2020 | Tsukamoto | F16H 9/18 |
| 10,641,366 | B2 | * | 5/2020 | Kuhl | F16H 9/18 |
| 11,306,809 | B2 | * | 4/2022 | Aitcin | B62M 27/02 |
| 11,592,100 | B2 | * | 2/2023 | Bonham | F16H 63/062 |
| 11,732,786 | B2 | * | 8/2023 | Williams | F16H 9/04 474/27 |
| 12,146,568 | B1 | * | 11/2024 | Stoltzfus | F16H 63/067 |
| 2002/0065156 | A1 | * | 5/2002 | Younggren | F16H 55/56 474/8 |
| 2002/0119846 | A1 | * | 8/2002 | Kitai | F16H 63/062 474/14 |
| 2002/0183145 | A1 | * | 12/2002 | Blanchard | F16H 61/6625 474/19 |
| 2004/0063524 | A1 | * | 4/2004 | Zulawski | F16H 55/56 474/19 |
| 2004/0092345 | A1 | * | 5/2004 | Borghi | F16H 55/56 474/19 |
| 2004/0142781 | A1 | * | 7/2004 | Huddleston | F16H 61/66272 474/19 |
| 2004/0185974 | A1 | * | 9/2004 | Labbe | F16H 61/66272 474/19 |
| 2004/0229723 | A1 | * | 11/2004 | Kalies | F16H 63/067 474/12 |
| 2004/0229724 | A1 | * | 11/2004 | Kalies | F16H 55/56 474/12 |
| 2004/0266570 | A1 | * | 12/2004 | Kalies | F16H 63/067 474/19 |
| 2005/0043128 | A1 | * | 2/2005 | Zulawski | F16H 55/56 474/10 |
| 2005/0096163 | A1 | * | 5/2005 | Gu | F16H 9/16 474/10 |
| 2005/0209032 | A1 | * | 9/2005 | Aitcin | F16H 55/56 474/19 |
| 2007/0105671 | A1 | * | 5/2007 | Binello | F16H 55/56 474/19 |
| 2009/0042678 | A1 | * | 2/2009 | Labbe | F16H 55/56 474/19 |
| 2009/0156338 | A1 | * | 6/2009 | Galletti | F16H 9/12 474/19 |
| 2011/0220453 | A1 | * | 9/2011 | Mueller | F16H 7/02 192/41 S |
| 2013/0005522 | A1 | * | 1/2013 | Raasch | F02D 29/06 474/19 |
| 2013/0157793 | A1 | * | 6/2013 | Dec | F16H 63/067 474/8 |
| 2013/0288833 | A1 | * | 10/2013 | Mueller | F16H 63/067 474/19 |
| 2013/0294856 | A1 | * | 11/2013 | Mueller | F16H 55/56 408/1 R |
| 2015/0024882 | A1 | * | 1/2015 | Ochab | F16H 63/067 474/19 |
| 2018/0180141 | A1 | * | 6/2018 | Kuhl | F16H 61/66245 |
| 2019/0285159 | A1 | * | 9/2019 | Nelson | F16H 57/027 |
| 2020/0149615 | A1 | * | 5/2020 | Kuhl | F16H 9/18 |
| 2023/0030435 | A1 | * | 2/2023 | Williams | F16H 9/14 |

* cited by examiner

DRIVEN CLUTCH FOR CONTINUOUSLY VARIABLE TRANSMISSION

CROSS REFERENCE TO RELATED APPLICATIONS

This application claims the benefit of U.S. Provisional Patent Application No. 63/616,940, filed Jan. 2, 2024, entitled "DRIVEN CLUTCH FOR CONTINUOUSLY VARIABLE TRANSMISSION," the entire contents of which are expressly incorporated by reference herein.

BACKGROUND

The continuously variable transmission (CVT) is ubiquitous in the recreational vehicle market, including all-terrain vehicles (ATVs), utility task vehicles (UTVs), snowmobiles, and other powersports vehicles. Mechanically, the CVT offers user-friendly operation, where the effective transmission gear ratio is continuously adjusted as the rotation rate (RPM) of the drive motor increases and decreases. However, the CVT is a complex mechanism, requiring several components. Additionally, packaging of CVT components within a recreational vehicle may be challenging, particularly in view of increasing demand for higher power and higher performance recreational vehicles. Moreover, CVT components may accumulate debris that foul internal mechanisms or wear components, which can adversely affect performance, thus requiring maintenance or remedial servicing.

SUMMARY

The disclosure describes CVT components, particularly driven clutch components, that mitigate fouling, better tolerate wear, and provide enhanced structural integrity while enabling compact CVT component packaging.

In some examples, the disclosure describes a driven unit helix assembly for a continuously variable transmission. The helix assembly includes a roller sleeve, a plurality of roller assemblies, a helix, a spring, and a helix sleeve. The roller sleeve includes a hollow cylinder extending along a drive axis from a distal end to a proximal end. Also the roller sleeve defines an aperture configured to receive in sliding engagement at least a portion of a post extending along a drive axis. A distal portion of the roller sleeve is configured to couple to a distal portion of a movable sheave. The plurality of roller assemblies each include a roller post extending radially outward from a first end coupled to a respective portion of the roller sleeve to a second end coupled to a roller. The helix includes a sidewall extending circumferentially around and coupled in an axial sliding engagement to at least a portion of the roller sleeve. The sidewall defines a plurality of roller tracks. Each respective roller track is configured to receive in a sliding engagement the roller of a respective roller assembly. The spring extends from a proximal end coupled to a proximal portion of the helix to a distal end configured to contact at least a portion of the distal portion of the movable sheave. The helix sleeve extends circumferentially around the helix and is configured to retain a fluid in the helix assembly.

In some examples, the disclosure describes a driven unit for a continuously variable transmission, that includes a post, a stationary sheave, a helix assembly, and a movable sheave. The post extends along a drive axis from a proximal end to a distal end. The stationary sheave extends from a distal portion coupled to a distal portion of the post to a proximal portion defining a first belt contact surface and a first plurality of fins. The helix assembly includes a roller sleeve, a plurality of roller assemblies, a helix, a spring cup, a spring, and a helix sleeve. The roller sleeve circumferentially surrounds and is coupled to at least a portion of the post between the proximal end and the distal end of the post. The plurality of roller assemblies each include a roller post extending radially outward from a proximal end coupled to the roller sleeve to a distal end coupled to a roller. The helix includes a sidewall extending circumferentially around and coupled in an axial sliding engagement to at least a portion of the roller sleeve. The sidewall defines a plurality of roller tracks. Each respective roller track is configured to receive in a sliding engagement a respective roller. The spring cup extends radially from an inner portion coupled to a proximal portion of the helix to an outer portion defining an axially extending lip. The spring extends from a proximal end coupled to the spring cup to a distal end. The helix sleeve extends circumferentially around the helix and is configured to retain a fluid in the helix assembly. The movable sheave extending axially from a distal portion coupled in sliding engagement to the roller sleeve to a proximal portion defining a second belt contact surface and a second plurality of fins. The distal end of the spring contacts at least a portion of the distal portion of the movable sheave and is configured to apply a spring force urging the movable sheave toward the stationary sheave. A medial portion of the movable sheave defines a cavity configured to receive therein at least a portion of the helix assembly.

BRIEF DESCRIPTION OF THE DRAWINGS

The disclosure can be understood in consideration of the following detailed description of various embodiments in connection with the accompanying drawings.

FIGS. 1A through 1D are conceptual diagrams illustrating an example continuously variable transmission (CVT) of a recreational vehicle in an idle configuration and an overdrive configuration.

DETAILED DESCRIPTION

Figure 1A:
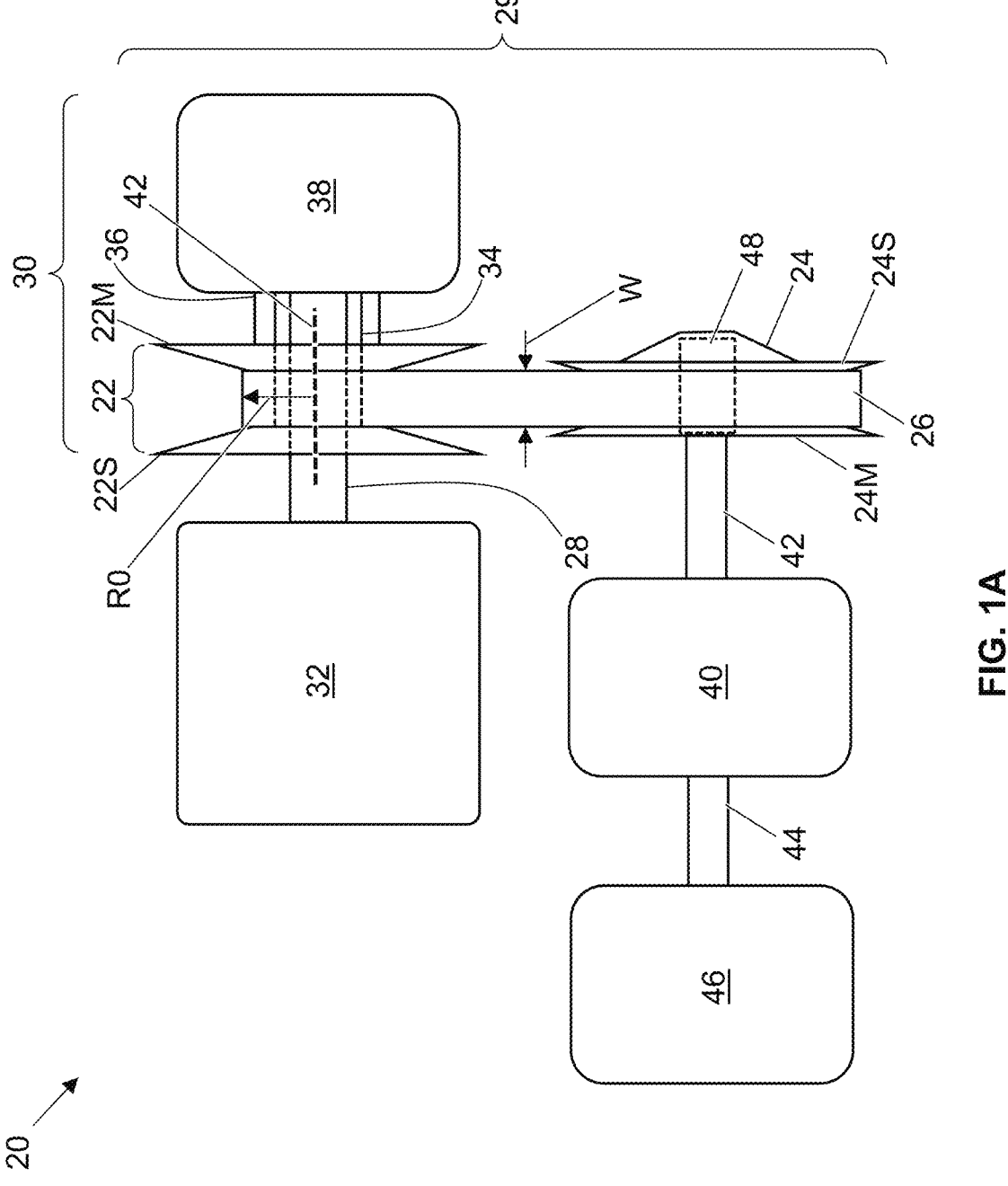

For purposes of promoting an understanding of the principles of the disclosure, reference will now be made to the examples illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Driven Variator Pulley with More than One Active Contact Element at all Times Beneath the Loaded Contact Arc of the Belt The described driven clutches include a helix assembly having two or more additional contact elements, i.e., rollers, compared to industry standard two- or three-roller designs. The additional rollers improve load sharing of alternating stress on rollers and other components under a belt contact sector at all variable ratios and enables more than two rollers reacting the bending moments of the driven clutch system.

A rubber belt CVT system works by varying diameters of the driver and driven pulleys to achieve variator ratios. Typical drive speed to driven speed ratio ranges may be from approximately 3.0:1 (underdrive) to 0.7:1 (overdrive). Because the packaging in recreational vehicles may be constrained for center-distance and high belt speeds of high-performance engines result in belt flutter for longer center distances, CVT systems may be designed with ratio of the sum of the drive and driven pulley outer diameter (OD) radii to center distances within a range from approximately 1.05 to approximately 1.50. This low ratio of pulley OD radii to center distance results in significant variation in belt contact of the pulleys.

For example, it is typical to see the belt contact sector vary from greater than about 210-degrees at underdrive to less than about 170-degrees at overdrive. Because the belt does not contact 360-degrees, there exists a bending moment due to the asymmetric belt contact and any deflections and bushing clearances that cause the rollers positioned in the belt contact sector to carry the torsional and axial loads generated by the belt and the helix.

A conventional three-roller with rollers spaced 120-degrees apart and near a 0.70:1 overdrive will have less than 1.4 rollers active on average due to it having a belt contact sector less than about 168-degrees. Indeed, during a full rotation, there may be several instances when only one roller will be under the belt contact sector because the 168-degrees arc of the belt contact sector is greater than the angular contact span between the three-rollers (120-degrees+120-degrees=240-degrees). Even a four-roller design with rollers paced 90-degrees apart has a spacing of (90+90=180-degrees) between three adjacent elements, resulting in times where the belt contact sector is only supported by one element. For a five-roller design, however, the contact span between three adjacent rollers is (72-degrees+72-degrees=144-degrees), which always ensures that greater than two rollers under the belt contact sector.

The impact of better load sharing of these contact elements reduces high spike loads at contact elements attributable to uneven load sharing, reduces wear of the sheave bushings which otherwise are responsible for taking up a greater portion of the bending moment, improves belt contact pressure uniformity as the belt rotates due to smaller magnitude rocking hand-offs from roller to roller, and reduces belt strain and belt temperatures thus enhancing durability. Additionally, for CVT systems having ratios that enable overdrive, which is common on most high-performance powersports CVTs, the number of contact elements may be non-axisymmetric, such as greater than four contact elements, which reduces symmetry rocking. With these improvements, combined CVT service intervals for bushings and belt can be increased for a given recreational vehicle without the need for more costly bushing materials, lubrication, or larger bushing/contact element packaging.

Figure 1B:
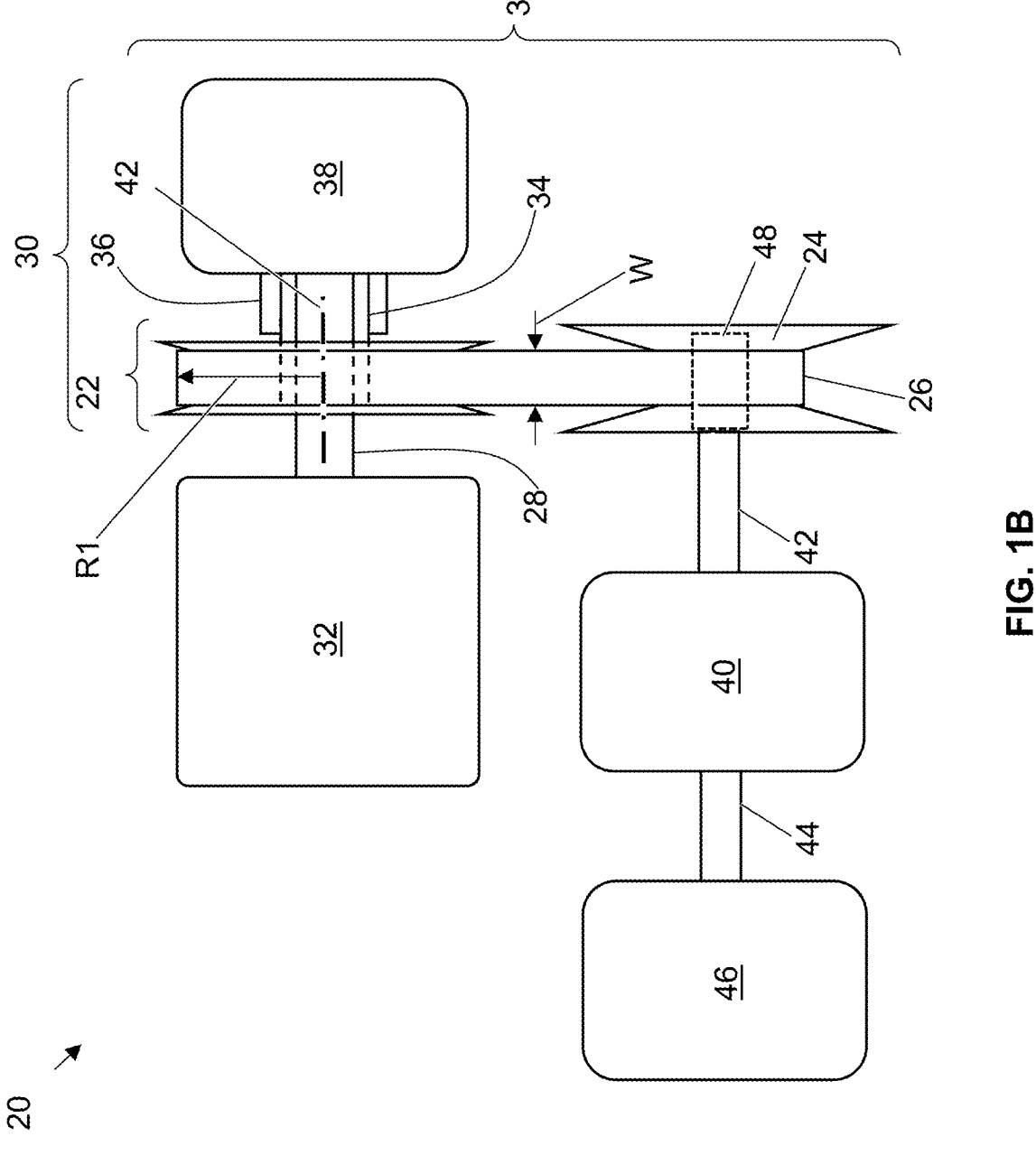
Figures 1C, 1D:
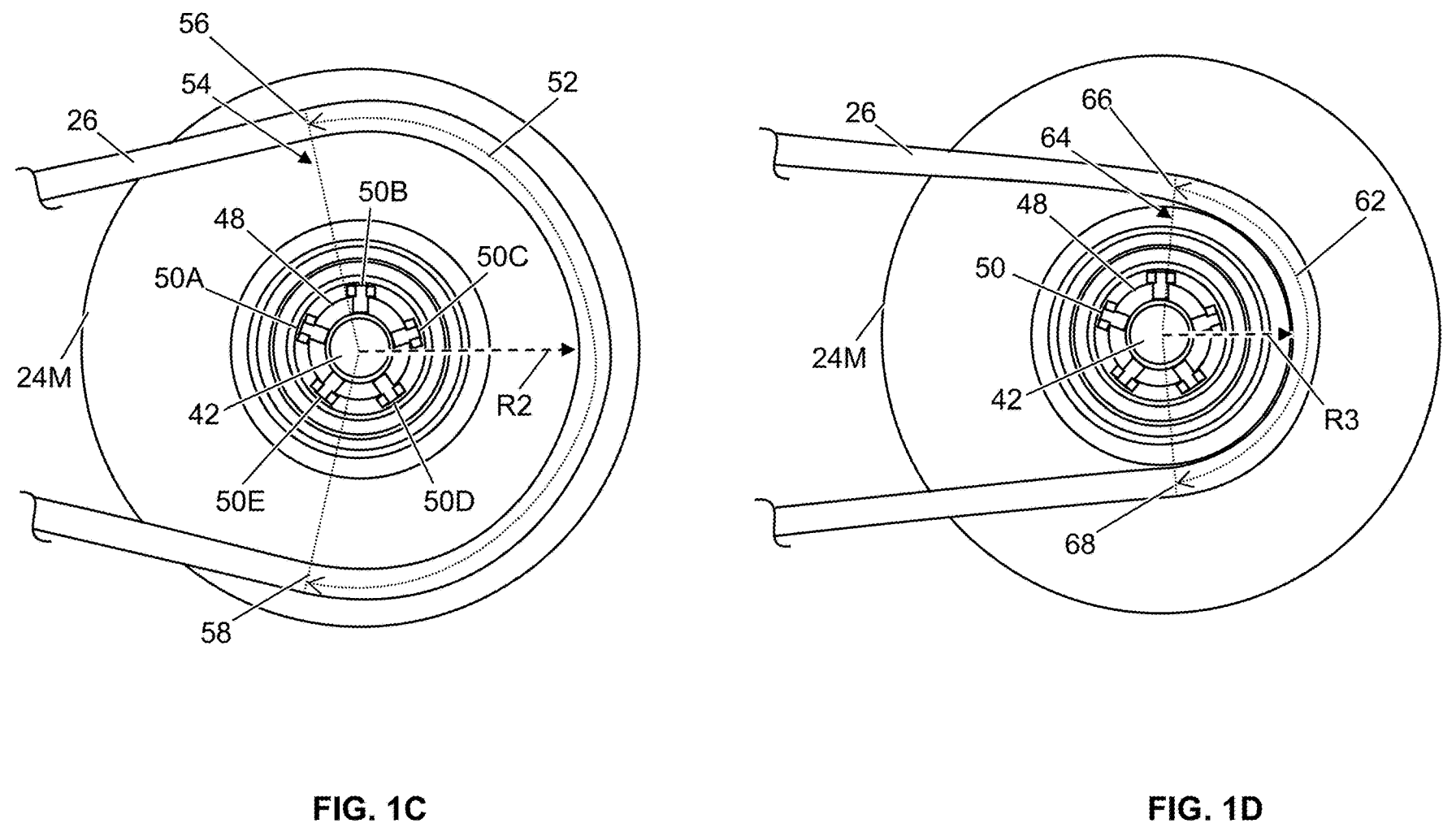

FIGS. 1A through 1D are conceptual diagrams illustrating an example continuously variable transmission 20 (hereinafter, CVT 20) of a recreational vehicle in an idle configuration (FIGS. 1A and 1C) and an overdrive configuration (FIGS. 1B and 1D). CVT 20 includes a drive clutch 22 (also referred to in industry as a primary clutch or drive pully) and a driven clutch 24 (also referred to in industry as a secondary clutch or driven pully). Drive clutch 22 and driven clutch 24 are mechanically (e.g., rotationally) coupled by a drive belt 26. Drive belt 26 may include a rubber belt or a steel belt having a width W.

Drive clutch 22 is coupled to a drive shaft 28 via a drive unit 30, drive shaft 28 being driven by a powerplant 32. Powerplant 32 may include an internal combustion engine, a hybrid engine, an electric motor, combinations thereof, or another machine to produce rotational motion of drive shaft 28. The drive unit 30 includes drive clutch 22, which is effectuated by cooperation between a post assembly 34 and a translatable hub assembly 36. The drive unit 30 also includes a spider assembly 38 that is affixed to the drive shaft 28. In some examples, drive unit 30 may include a drive clutch as described in U.S. Provisional Patent Application No. 63/582,534, entitled "Drive Clutch for Continuously Variable Transmission," filed on Sep. 14, 2023, the entire contents of which is incorporated by reference herein.

Driven clutch 24 is coupled to a gearbox 40 via an input shaft 42. Gearbox 40 is configured to control the power and torque transmitted from driven clutch 24 to other drivetrain components 44 and, thereby, to ground engaging members 46 of the recreational vehicle. In other examples, input shaft 42 may be coupled to a snowmobile jackshaft or an input shaft of a reduction system of a belt or chain reduction drive unit. Driven clutch may include a helix assembly 48. Helix assembly 48 enables an axially translation of a movable sheave 24M relative to a stationary sheave 24S, which provides continuous variable shifting in response to a rotational speed of driven clutch 24.

As illustrated in FIG. 1A, when in the idle configuration, drive clutch 22 may be in an open configuration (i.e., a distance between movable sheave 22M and stationary sheave 22S is at a maximum) and driven clutch 24 may be in a closed configuration (i.e., a distance between movable sheave 24M and stationary sheave 24S is at a minimum). In the idle configuration, drive belt 26 may be sufficiently loose so that rotation of drive clutch 22 does not transfer to a rotation of driven clutch 24 or otherwise rotates driven clutch 24 at rotation rate which does not transmit torque to wheels of the recreational vehicle.

As illustrated in FIG. 1B, when in the overdrive configuration, drive clutch 22 may be in a closed configuration (i.e., a distance between movable sheave 22M and stationary sheave 22S is at a minimum) and driven clutch 24 may be in an open configuration (i.e., a distance between movable sheave 24M and stationary sheave 24S is at a maximum). In the overdrive configuration, drive belt 26 is fully extended by the drive clutch 22 into the driven clutch 24 for a maximum rotational speed of the driven clutch 24.

As drive clutch 22 and driven clutch 24 move from the idle configuration to the overdrive configuration, a belt radius as each clutch changes in opposing directions. For example, with respect to drive clutch 22, the drive belt 26 defines a minimum outer belt radius R0 about the drive axis 42 in the idle configuration 29 and a maximum outer belt radius R1 in the overdrive configuration 31, as illustrated in FIGS. 1A and 1B.

With respect to driven clutch 24, as illustrated by the cross-sectional view of driven clutch 24 in FIG. 1C, in the idle configuration, drive belt 26 defines a maximum outer belt radius R2 about input shaft 42. As illustrated FIG. 1D, in the overdrive configuration, drive belt 26 defines a minimum outer belt radius R3 about shaft 42.

When force is transferred from belt 26 to input shaft, force is transmitted from movable sheave 24M through helix assembly 48 to shaft 42. Force also may be transmitted from stationary sheave 24S (FIGS. 1A and 1B) which may be directly coupled to shaft 42 (e.g., via a static coupling member such as a splined post or the like).

In the idle configuration, FIG. 1C, when force is transmitted from movable sheave 24M through helix assembly 48, the force may be concentrated on portions of helix assembly 48 within a force transfer sector 54 defined by belt-sheave contact surface 52 (illustrated as an arch in dashed lines with terminating arrows) and radii 56 and 58 (illustrated as dash lines) extending from each endpoint of the belt-sheave contact surface 52 to the axis of shaft 42. Similarly, in the overdrive configuration, FIG. 1D, when force is transmitted from movable sheave 24M through helix assembly 48, the force may be concentrated on portions of helix assembly 48 within a force transfer sector 64 defined by belt-sheave contact surface 62 (illustrated as an arch in dashed lines with terminating arrows) and radii 66 and 68 (illustrated as dash lines) extending from each endpoint of the belt-sheave contact surface 62 to the axis of shaft 42. As depicted in FIGS. 1C and 1D, (overdrive) force transfer sector 64 is smaller than (idle) force transfer sector 54.

Because helix assembly 48 includes five rollers 50A through 50E (collectively, rollers 50), at least two rollers 50 are within the force transfer sector in either the overdrive or idle configuration. For example, five rollers 50 may be evenly spaces at about 72-degrees about helix assembly 48 and the minimum force transfer sector 64 (i.e., during an overdrive configuration) may be greater than at least 144-degrees.

By including at least two rollers in the force transfer sector, forces may be more evenly transferred from movable sheave 24M to shaft 42 compared to designs that include fewer rollers. More even transfer of force may reduce component wear and enable helix assembly 48 to withstand greater rotational speed, torque forces, or both before deforming, deflecting, or otherwise reacting to the force in a manner that may damage or reduce the useable life of one or more components of driven clutch 24. In this way, driven clutch 24 as describe herein may have improved wear tolerance and enhanced structural integrity compared to roller assemblies with fewer than five rollers, such as roller assemblies with two rollers or three rollers.

Figure 2A:
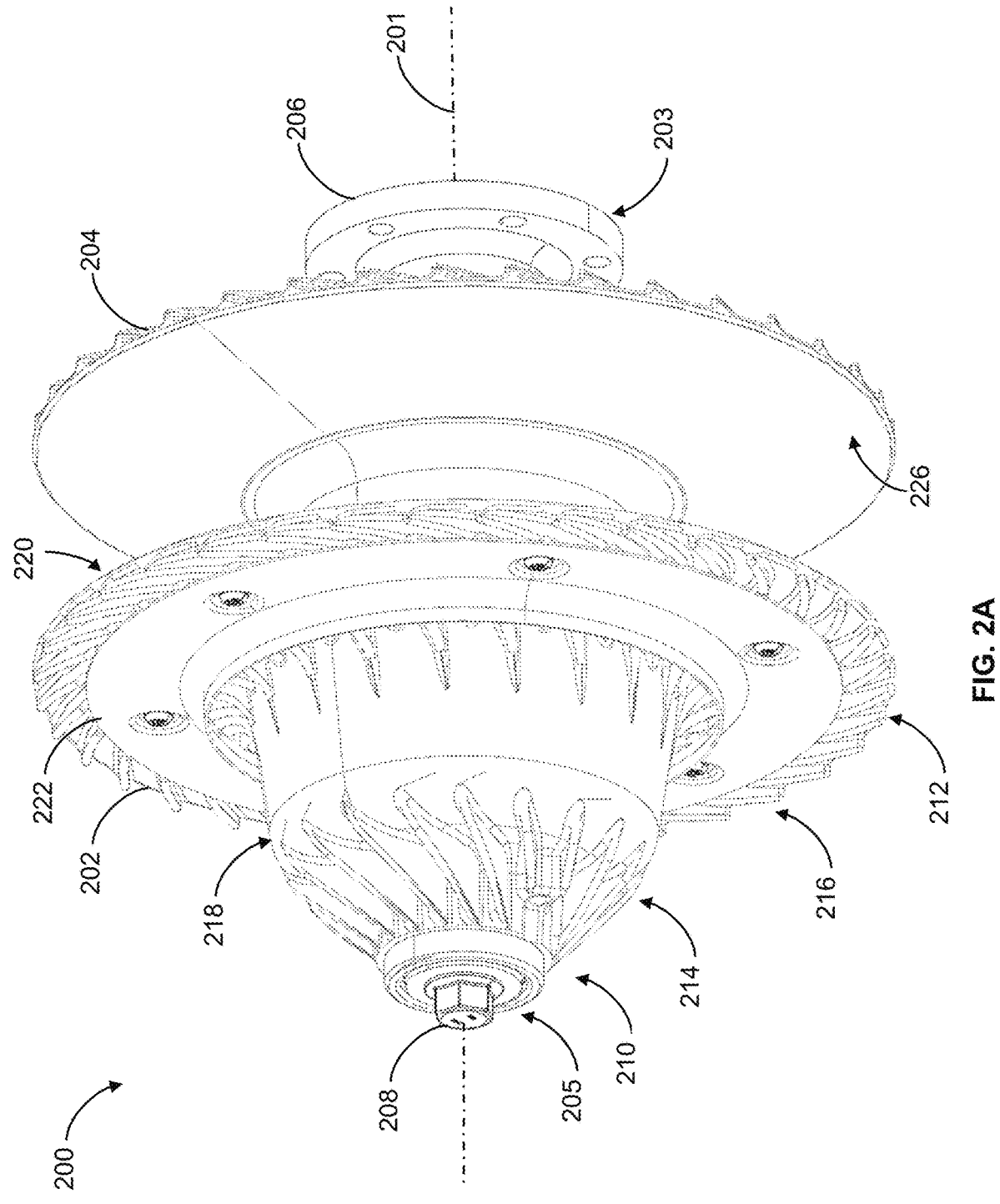
FIGS. 2A through 2G are conceptual diagrams illustrating various views of an example driven clutch.
Figure 2B:
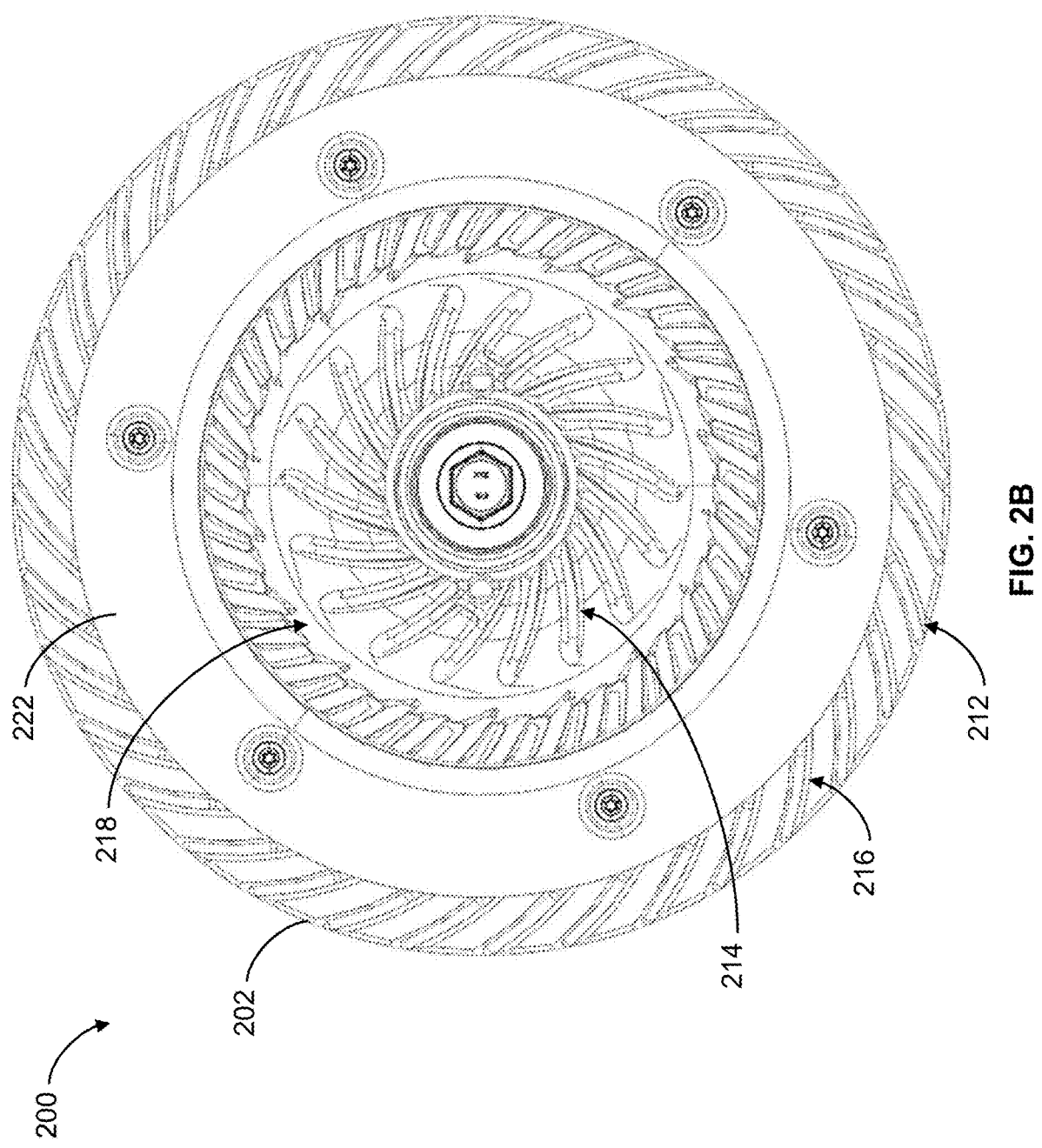
Figure 2C:
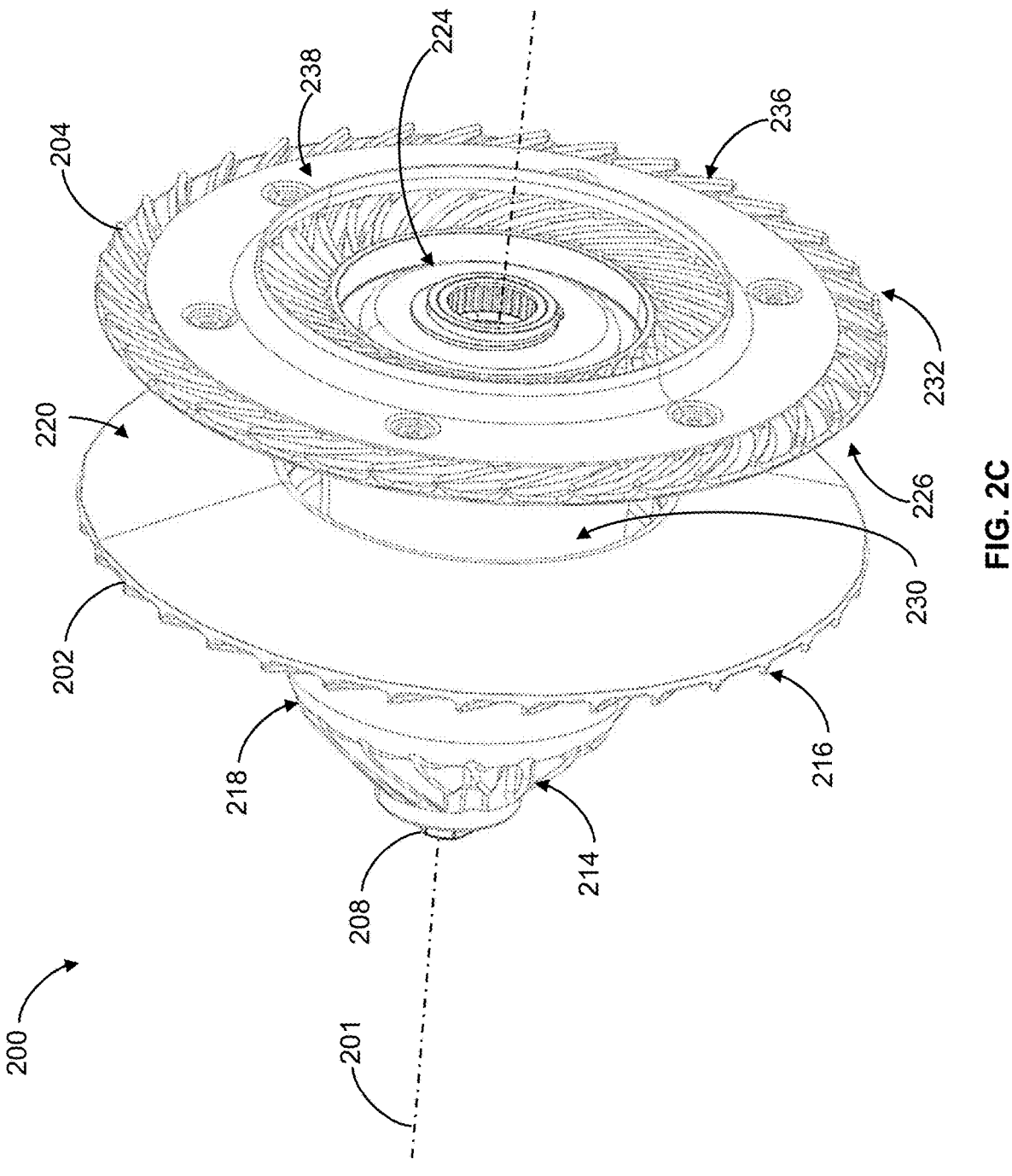
Figure 2D:
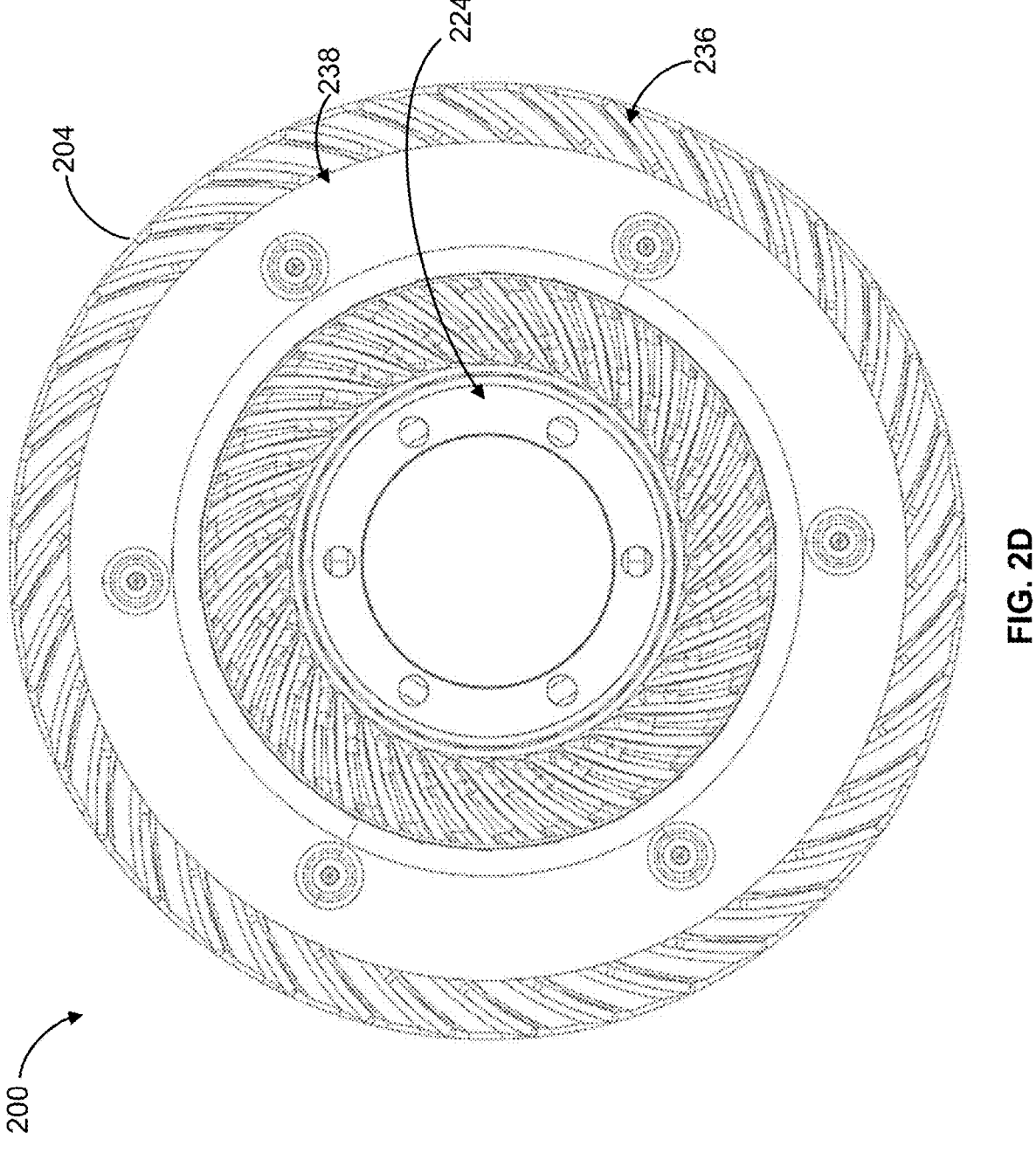
Figure 2E:
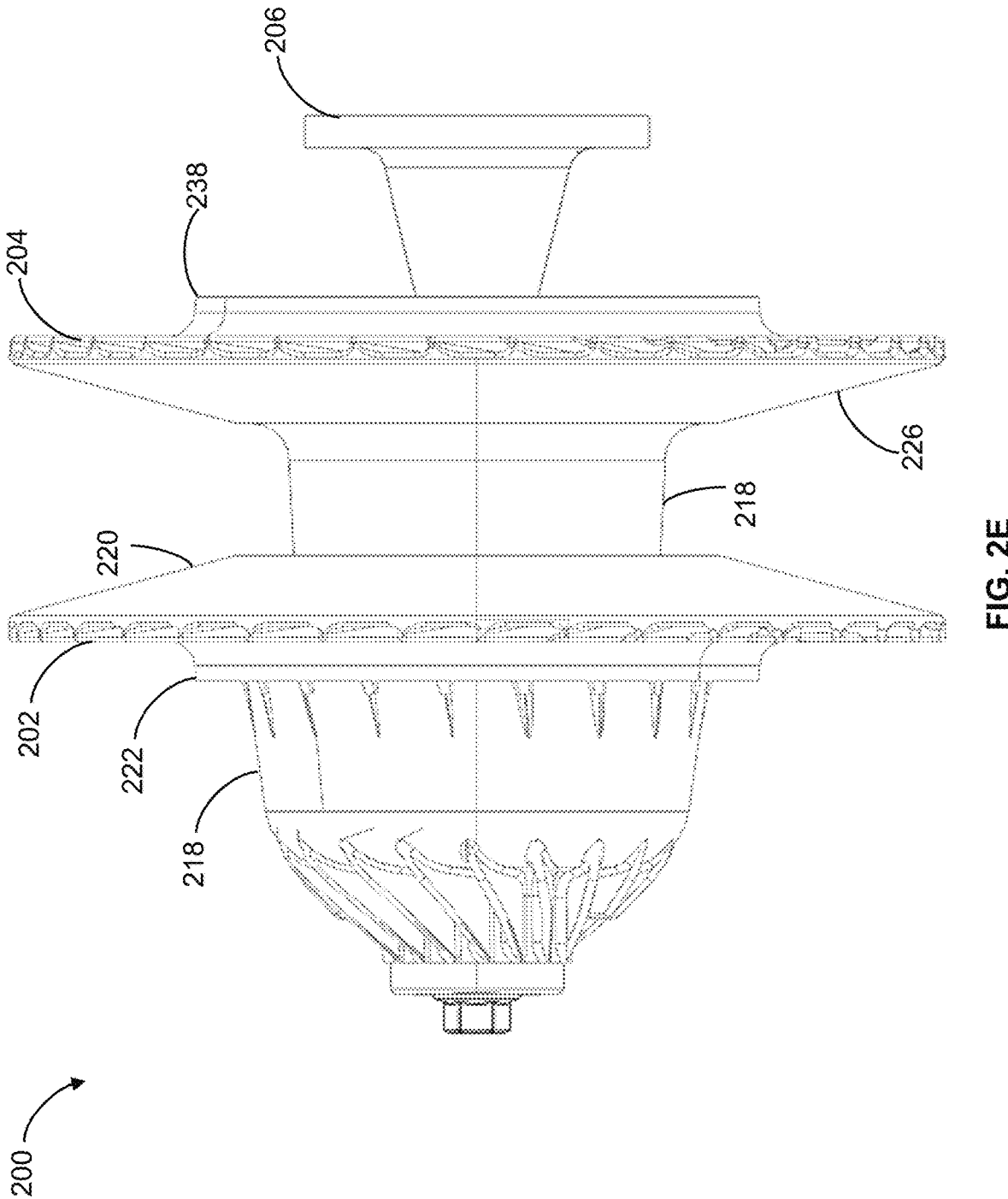
Figure 2F:
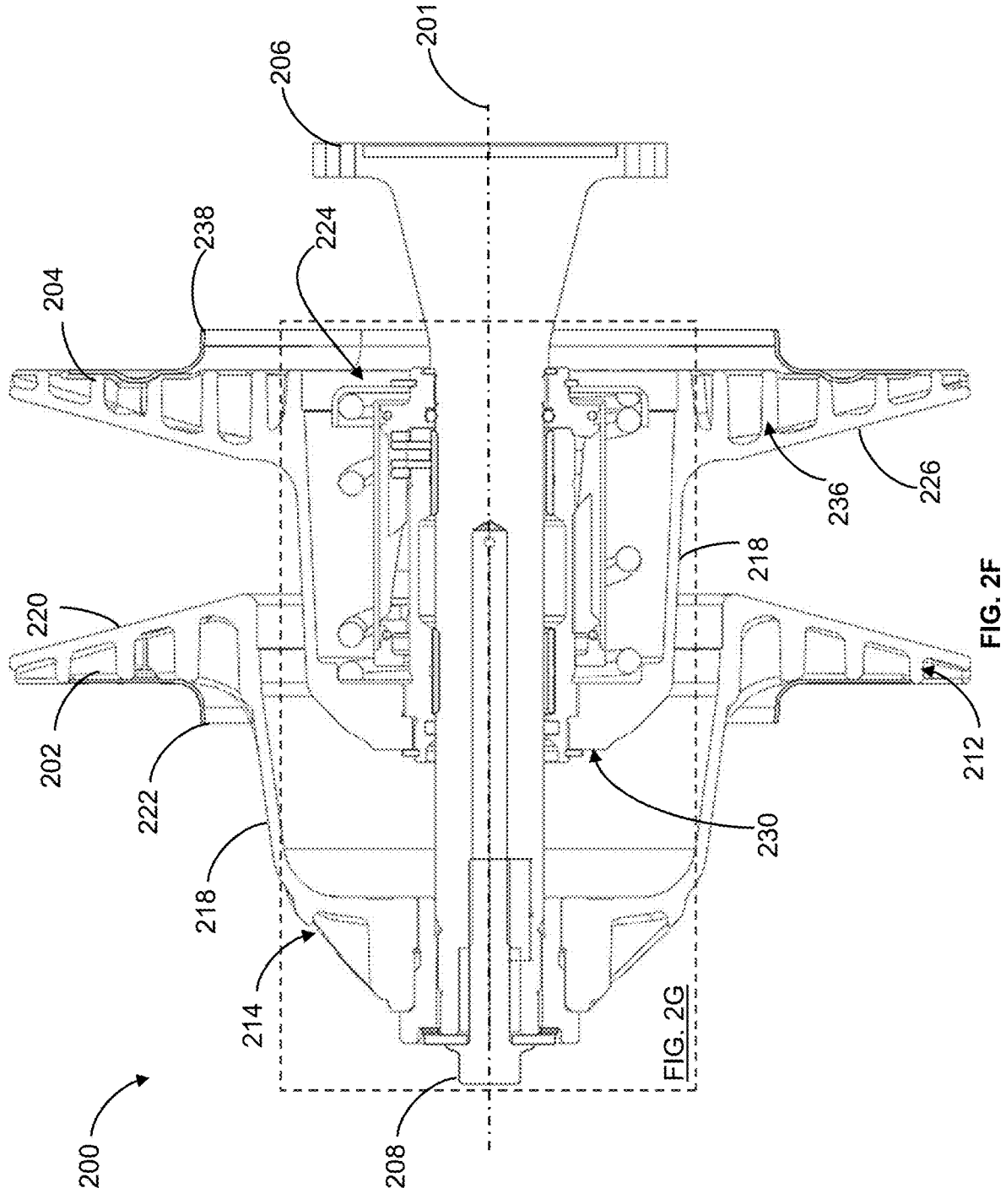
Figure 2G:
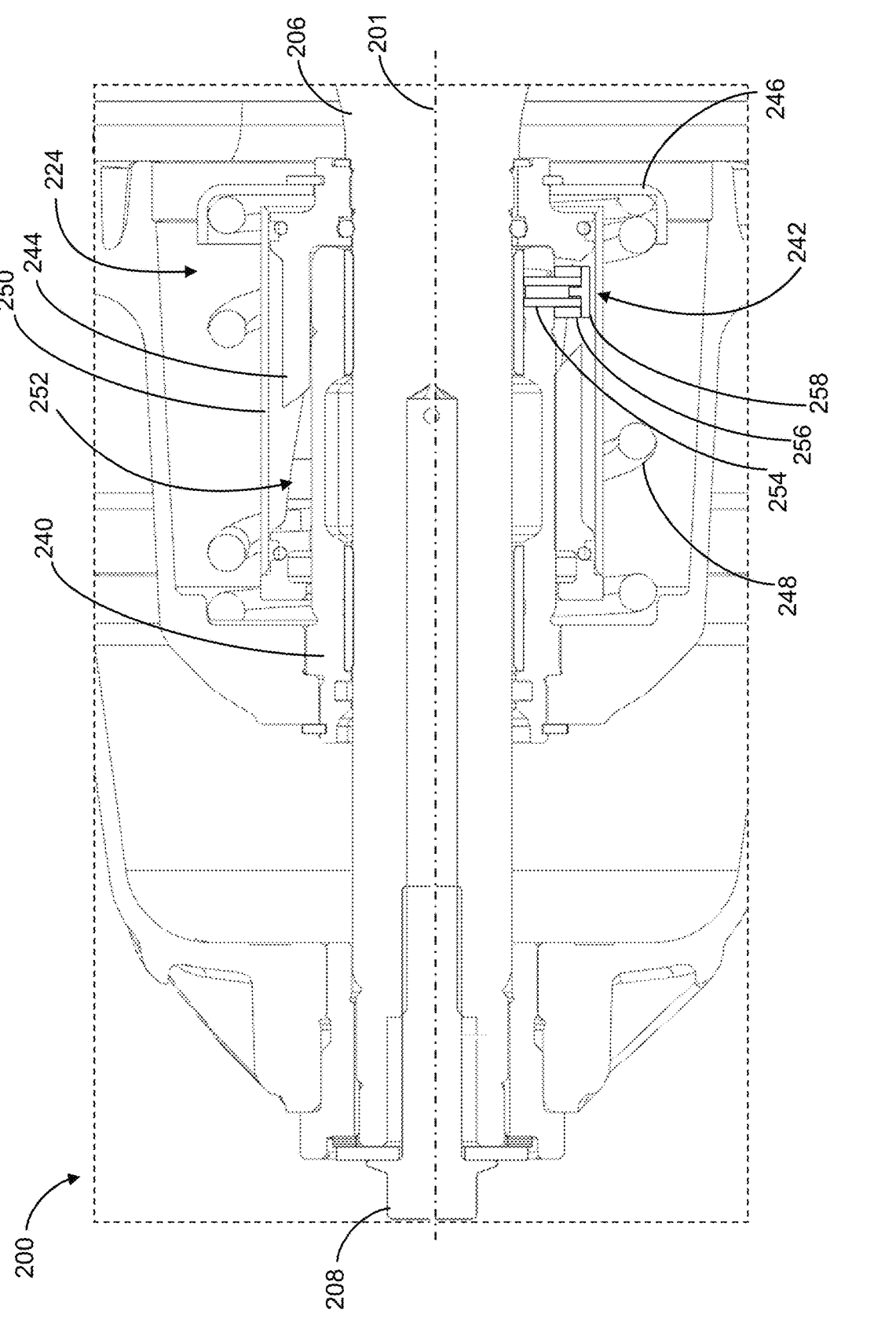

FIGS. 2A through 2G are conceptual diagrams illustrating various views of an example driven clutch 200. FIG. 2A is a right perspective view, FIG. 2B is a front view, FIG. 2C is a left perspective view, FIG. 2D is a rear view, FIG. 2E is a right-side view, FIG. 2F is cross sectional of view in FIG. 2E taken along a central axis of driven clutch 200, and FIG. 2G is a magnified view of FIG. 2F. Driven clutch 200 may the be same or substantially similar to driven clutch 24 described above in reference to FIGS. 1A through 1D.

Driven clutch 200 includes a stationary sheave 202 and a movable sheave 204 which are mechanically coupled to a post 206 extending along a drive axis 201 from a proximal end 203 to a distal end 205. Stationary sheave 202 may be fixed to post 206 and movable sheave 204 may be retained on post 206 in a sliding engagement.

As illustrated in FIG. 2A, stationary sheave 202 extends from a distal end 210 to a proximal end 212. A distal portion of stationary sheave 202 is coupled to a distal portion of post 206 via a fastener 208. A proximal portion of stationary sheave 202 defines a first belt contact surface 220. A radially exterior surface of stationary sheave 202 defines an optional plurality of distal fins 214 (hereinafter, distal fins 214) and an optional plurality of proximal fins 216 (hereinafter, proximal fins 216). During use, when stationary sheave 202 is rotating, distal fins 214 and proximal fins 216 may cause air at or near the radially exterior surface of stationary sheave 202 to move. The shape of distal fins 214 and proximal fins 216 may be selected to cause a particular pattern of air movement. In this way distal fins 214 and proximal fins 216 may be configured to cause air cooling, ejection of airborne debris, or both of components of driven clutch 200 and components of a recreational vehicle in proximity to driven clutch 200.

In some examples, stationary sheave 202 may include a windage plate 222 configured to further direct the air movement imparted by distal fins 214 and/or proximal fins 216. Optionally, windage plate 222 may be configured to interact with baffles or other structures of adjacent components of a recreational vehicle, e.g., a driven clutch cover, a baffle or corresponding windage plate extending from a driven clutch cover, or the like. By interacting with baffles or other structures the direction of air movement enabled by windage plate 222 may enhance air cooling, ejection of airborne debris, or both of components of driven clutch 200 or components of a recreational vehicle in proximity to driven clutch 200 compared to driven clutch systems that do not include a windage plate 222.

As illustrated in FIG. 2B (post 206 removed for clarity), movable sheave 204 extends from a distal end 230 to a proximal end 232. A distal portion of movable sheave 204 is coupled to a distal portion of a helix assembly 224. Helix assembly 224 enables movable sheave 204 to axially translate along post 206 (e.g., along drive axis 201) relative to stationary sheave 202. A distal portion of movable sheave 204 defines a second belt contact surface 226. A radially exterior surface of movable sheave 204 defines an optional plurality of proximal fins 236 (hereinafter, proximal fins 236). During use, when movable sheave 204 is rotating, proximal fins 236 may cause air at or near the radially exterior surface of movable sheave 204 to move. The shape of proximal fins 236 may be selected to cause a particular pattern of air movement. In this way proximal fins 216 may be configured to cause air cooling, ejection of airborne debris, or both of components of driven clutch 200 or components of a recreational vehicle in proximity to driven clutch 200.

In some examples, movable sheave 204 may include a windage plate 238 configured to further direct the air movement imparted by proximal fins 236. Optionally, windage plate 238 may be configured to interact with baffles or other structures of adjacent components of a recreational vehicle, e.g., a driven clutch cover, a baffle or corresponding windage plate extending from a driven clutch cover, or the like. By interacting with baffles or other structures the direction of air movement enabled by windage plate 238 may enhance air cooling, ejection of airborne debris, or both of components of driven clutch 200 or components of a recreational vehicle in proximity to driven clutch 200 compared to driven clutch systems that do not include a windage plate 238.

In reference to the cross-sectional view depicted in FIG. 2F, stationary sheave 202 and movable sheave 204 may define bell shape components. A medial portion 218 of stationary sheave 202 (e.g., the waist of the bell extending from the shoulder to a mouth) is configured to receive therein a distal portion and at least parts of a medial portion 228 of movable sheave 204 (e.g., the crown and at least a part of the waist of the bell). Furthermore, medial portion 228 of movable sheave is configured to receive therein at least a portion of helix assembly 224. For example, in the overdrive configuration of driven clutch 200 illustrated in FIG. 2F, helix assembly 224 is completely nested in medial portion 218 of movable sheave 204. When in an idle configuration, the medial portion 218 of stationary sheave 202 is shaped to receive therein the medial portion 218 of movable sheave 204. In this way, driven clutch 200 may be more compactly packaged compared to driven clutches in which the stationary sheave, movable sheave, and/or helix assembly are not at least partially or fully nested.

As illustrated in FIG. 2G, helix assembly 224 includes a roller sleeve 240, a plurality of roller assemblies 242, a helix 244, a spring cup 246, a spring 248, and a helix sleeve 250. Helix assembly 224 is configured to couple the stationary portion of driven clutch 200 to the movable portion of driven clutch 200. The configurations of helix assembly 224 described herein may provide enhanced performance, increased wear resistance, and reduced debris intrusion compared to other helix systems used for secondary clutches. For example, helix assembly 224 enables improved load sharing by including five roller assemblies 242 under a belt contact region at all variable ratios, including an overdrive configuration.

Roller sleeve 240 and helix 244 are configured to facilitate the axial movement of movable sheave 204 along post 206 and maintain a stable rotation of movable sheave 204 about drive axis 201 over the life of the helix assembly 224. Roller sleeve 240 defines a hollow cylinder extending along drive axis 201 from a distal end to a proximal end. The aperture defined by roller sleeve 240 is configured to receive in sliding engagement at least a portion of post 206. A distal portion of roller sleeve 240 is configured to couple to a distal portion (e.g., at or near distal end 230) of movable sheave 204. In some examples, a radially interior surface and/or a radially exterior surface of roller sleeve 240 may define one or more recesses, such as circumferential grooves, that are configured to receive therein one or more collars, seals, dynamic seals, bushings, slide bushings, or components suitable to facilitate axial movement of roller sleeve 240 along post 206.

Helix 244 defines a hollow cylinder extending along drive axis 201 from a distal end to a proximal end. The aperture defined by helix 244 is configured to receive in sliding engagement at least a portion of roller sleeve 240. In other words, helix 244 includes a sidewall extending circumferentially around and coupled in an axial sliding engagement to at least a portion of the roller sleeve 240. A proximal portion of helix 244 is configured to coupled to a proximal portion of post 206.

The sidewall of helix 244 defines a plurality of roller tracks 252. Each respective roller track of the plurality of roller tracks 252 is configured to receive in a sliding engagement a respective roller assembly 242. In some examples, helix 244 defines five roller tracks. In other examples, helix 244 may define fewer roller tracks or more roller tracks. In some examples, the number of roller tracks may be limited by the proximity of adjacent roller tracks and the ability of the material of helix 244 between adjacent roller tracks to transmit torque without bending or deforming. Roller tracks 252 may define any suitable in any of the axial, radial, or circumferential directions. In some examples, the radially interior surface and/or radially exterior surface of helix 244 may define one or more recesses, such as circumferential grooves, that are configured to receive therein one or more collars, seals, dynamic seals, bushings, slide bushings, or components suitable to facilitate axial movement of roller sleeve 240 with helix 244.

Roller assemblies 242 extend radially outward from roller sleeve 240 and are configured to travel within roller tracks 252 enabling axial movement of roller sleeve relative to helix 244 while transmitting rotational movement (i.e., torque) from movable sheave 204 to post 206. Roller assemblies 242 may include a roller post 254 extending radially outward from a proximal end coupled to roller sleeve 240 to a distal end coupled to a roller 256. In other examples, roller assemblies 242 may include other components or an integral component.

Roller post 254 defines a hollow cylinder extending from a proximal end coupled to roller sleeve 240 to a distal end. Roller post 254 may be coupled to roller sleeve 240 by any suitable means, such as, for example, adhesives, mechanical fasteners, welding, or the like. Roller post 254 may include any material or combination of materials suitable to transmit torque from roller sleeve 240 to helix 244, such as a metal, a polymer, or a combination thereof.

Roller 256 defines a hollow cylinder configured to receive therein and couple with at least a portion of roller post 254. Roller post 254 may be coupled to roller sleeve 240 by any suitable means, such as, for example, adhesives, mechanical fasteners, welding, or the like. Roller 256 may have an outer diameter that is greater than the outer diameter of roller post 254. In this way, roller 256 may define a surface that contacts roller tracks 252 of helix 244. Roller 256 may include any material or combination of materials suitable to transmit torque from roller post 254 to helix 244 and withstand wear from translation of roller 256 within roller track 252, such as a metal, a polymer, or a combination thereof. In some examples, roller 256 may include at least one of a bearing and a polymeric slider.

In some examples, roller assembly 242 may include a wear button 258 extending radially outward from the roller post 254, the roller 256, or both. Wear button 258 may be configured to reduce wear at an interface between roller assemblies 242 and helix sleeve 250. Wear button 258 may include a proximal stem configured to friction-fit within the distal aperture defined by the hollow cylinder of roller 256. A distal cap of wear button 258 may extend across a diameter of roller 256 to prevent direct contact of roller with helix sleeve 250. Wear button 258 may include any material or combination of materials suitable to reduce wear of helix sleeve 250 and/or roller assembly 242, such as a polymer.

Spring cup 246 extends radially from a radially inner portion coupled to a proximal portion of helix 244 to a radially outer portion. In this way, spring cup 246 defines a surface that is fixed to helix 244, which can transmit a spring force to helix 244. In some examples, spring cup 246 may define an axially extending lip configured to maintain radial alignment of spring 248 relative to drive axis 201. In some examples, the axially extending lip may provide a friction fit with at least a portion of spring 248.

Spring 248 extends from a proximal end coupled to spring cup 246 to a distal end. The distal end of spring 248 is configured to contact at least a portion of movable sheave 204. For example, spring 248 may interface with an interior surface of distal end 230 of movable sheave 204. Spring 248 is configured to impart a spring force on movable sheave 204 and helix 244 thereby urging movable sheave in a distal direction. In this way, in an idle configuration, movable sheave 204 may be urged toward stationary sheave 202 by spring 248. In response to rotation of stationary sheave 202 and movable sheave 204, motion of a belt and the centripetal force of the sheaves and/or other components of driven clutch 200 may at least partially overcome the spring force, thereby at least partially compressing spring 248 and allowing the movable sheave 204 to axially translate in the proximal direction away from stationary sheave 202. This axial translation of movable sheave 204 provides for continuous variable shifting of driven clutch 200 based on a rotational speed of the components of driven clutch 200.

Helix sleeve 250 is configured to protect components of helix assembly 224 from intrusion of debris and may optionally retain a fluid or a lubricant within helix assembly 224. Helix sleeve 250 defines a hollow cylinder configured to receive therein and couple with at least a portion of helix 244 such that helix sleeve 250 extends circumferentially around helix 244. In some examples, a radially interior surface and/or a radially exterior surface of helix sleeve 250 may define one or more recesses, such as circumferential grooves, that are configured to receive therein one or more collars, seals, bushings, or components suitable to seal the interior of helix assembly 224.

Although described herein as the roller sleeve 240 and roller assemblies 242 being radially internal to the helix 244, in other examples, helix 244 may be radially internal to a coaxial roller sleeve 240 having roller assemblies that extend radially inward. The inverted configuration may provide a benefit in how forces during rotation of the driven clutch 200 may overcome a spring force, reduction in debris intrusion, or improved sealing of lubricants within the helix assembly. For example, the inverted configuration may provide a larger diameter for roller post 254 of the roller assemblies 242 to react against the roller sleeve 240, additionally, it reduces the relative motion between roller post 254 and helix 244 into only rotational motion of roller post 254 instead of the combined rotational and axial translation of roller post 254 along the helix 244 as the sheave is actuated. In some examples, however, the inverted configuration may be more difficult to manufacture (e.g., due to the radially inward projection of rollers) compared to a non-inverted configuration.

Figure 3A:
FIGS. 3A through 3C are conceptual diagrams illustrating an example driven unit helix assembly for a CVT.
Figure 3B:
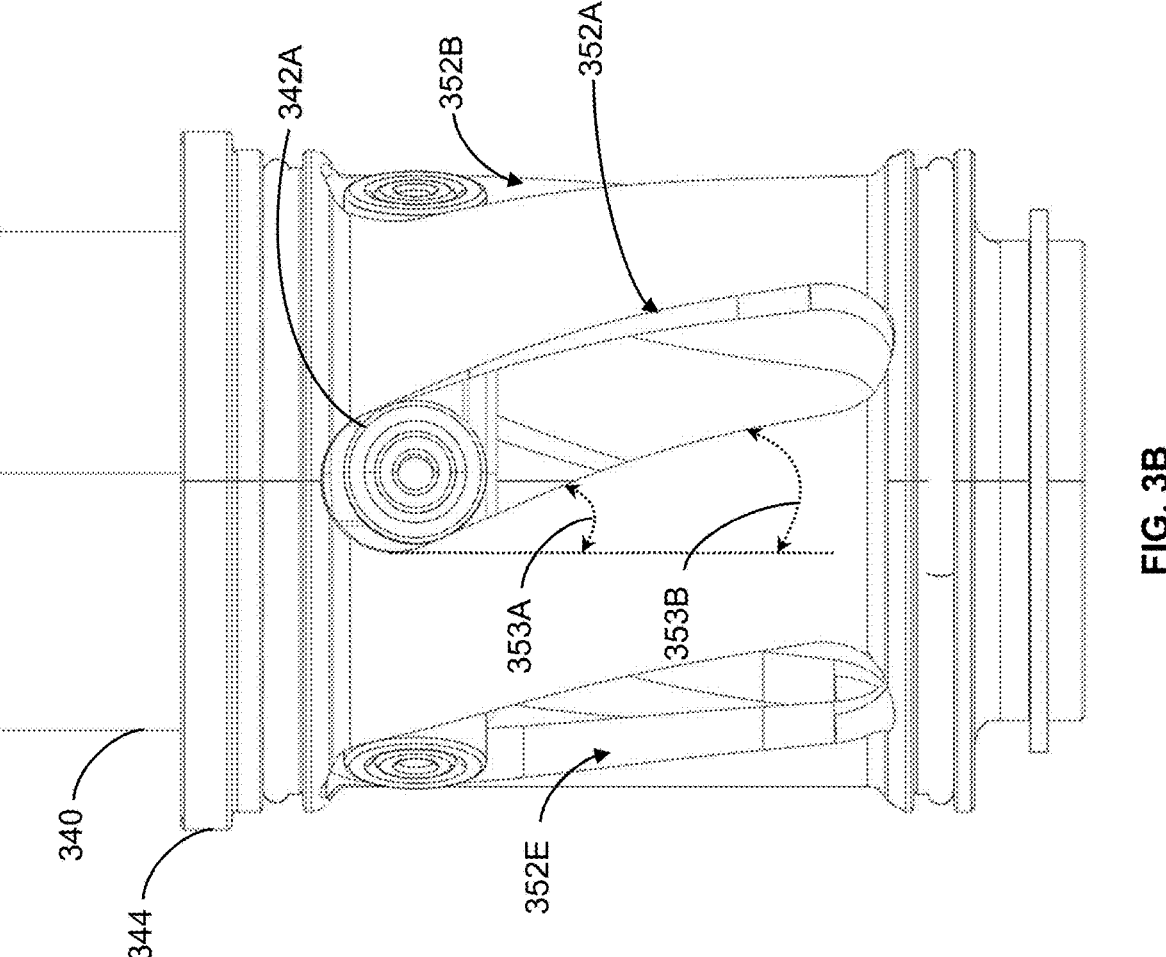
Figure 3B:
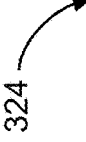
Figure 3C:
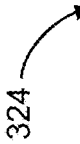

FIGS. 3A through 3C are conceptual diagrams illustrating an example driven unit helix assembly 324 for a CVT. Helix assembly 324 may be the same as or substantially similar to helix assemblies 48 and/or 224 described above in reference to FIGS. 1A through 2G, except for the differences described herein. For example, helix assembly 324 includes a roller sleeve 340, a plurality of roller assemblies 342A through

342E (collectively, rollers 342), a helix 344, as well as a spring cup, a spring, and a helix sleeve (not illustrated for clarity).

As illustrated in the exploded view of FIG. 3A, helix assembly 324 includes components configured to facilitate axial translation of roller sleeve 340 along a post (e.g., post 206) and to seal a volume between the post and a helix sleeve (e.g., helix sleeve 250). For example, roller sleeve 340 is configured to receive therein sliders 341A and 341B (collectively, sliders 341). Sliders 341 define a hollow cylinder having a radially exterior surface configured to couple with roller sleeve 340 and a radially interior surface configured to slidingly engage a post. In some examples, the radially exterior surface of sliders 341 configured to contact a radially interior surface of roller sleeve 340, such as a recess defined by a radially interior surface of roller sleeve 340. By defining an interface between roller sleeve and a post, sliders 341 may include a material different than a material of helix sleeve 340, which may be selected to reduce wear at the interface of the sliders 341 and the post. Additionally, or alternatively, sliders 341 may be configured to assist in retention of a fluid, such as a lubricant, within the helix assembly, particularly at the interface of roller sleeve 340 and the post.

Helix 344 is configured to receive static seals 345A, 345B, and 345C (collectively, seals 345). Seals 345A and 345B may be received within respective recesses 347A and 347B defined by a radially exterior surface of helix 344. Similarly, seal 345C may be received by a recess defined by a radially interior surface of helix 344. Seals 345A and 345B are configured to provide a seal between helix 344 and a helix sleeve. Seal 345C is configured to provide a seal between helix 344 and a post. In these ways, seals 345A, 345B, and 345C enable a helix sleeve and a post to define a volume including helix 344 that may be filled with a fluid, such as a lubricant. As discussed in further detail below, a helix assembly 300, may include one or more dynamic seals between roller sleeve 340 and helix 344 that enable axial translation between these components while providing a seal volume between a helix sleeve and a post that may be filled with a fluid, such as a lubricant.

Helix 344 defines roller tracks 352A through 352E (collectively, roller tracks 352). Roller track 352 may define any suitable shape. The shape of roller tracks 352 may be selected to provide desired performance characteristics such as a rate of change of variator ratio at select rotational rates, to enable engine braking, or the like. As illustrated in the side view of FIG. 3B, roller tracks 352 include a first portion having a first angle 353A relative to a plane extending in the axial direction (e.g., parallel to a drive axis, such as drive axis 201) and a second portion having a second angle 353B. The first angle 353A and second angle 353B may be different. There may be a third portion defining a transition zone between first angle 353A and second angle 353B. In some examples, first angle 353A and second angle 353B may be within a range from about 0-degrees and about 50-degrees, such as within a range from about 0-degrees and about 40-degree. In some examples, first angle 353A and/or second angle 353B may a negative angle (as depicted), such as within a range from about 0-degrees and about negative 50-degrees or negative 45-degrees. In some examples, the helical ramp is not defined by any discrete angle, and consists of a continuously changing angle spline, such as within a range from (+/−) 45-degrees.

In some examples, a projection in the axial direction of at least a first portion of a first roller track 352 may overlap with at least a second portion of a second roller track 352.

As illustrated in the cross-sectional view of FIG. 3C, a sidewall of helix 344 defining roller track 352A may be substantially normal to the sidewall, i.e., extending 90 degrees (plus or minus machining tolerances) to a tangent line at an edge of roller track 352A. In some examples, opposing sidewalls defining roller track 352A may be parallel. Parallel opposing sidewalls defining roller track 352A may be easier to manufacture compared to opposing sidewalls that are not parallel. As roller 356A travels along roller track 352A, the sidewalls may not be parallel to roller 356A, which may result in scrubbing or contact at certain portions of roller 356A with the sidewall defining roller track 352A. To reduce scrubbing, the sidewalls defining roller track 352A may be machined to be parallel to roller 356A at each axial position of roller 356A within roller track 352A. To further reduce scrubbing, a shape of roller 356A may be selected to define a trapezoid or frustum.

Figures 4A, 4B:
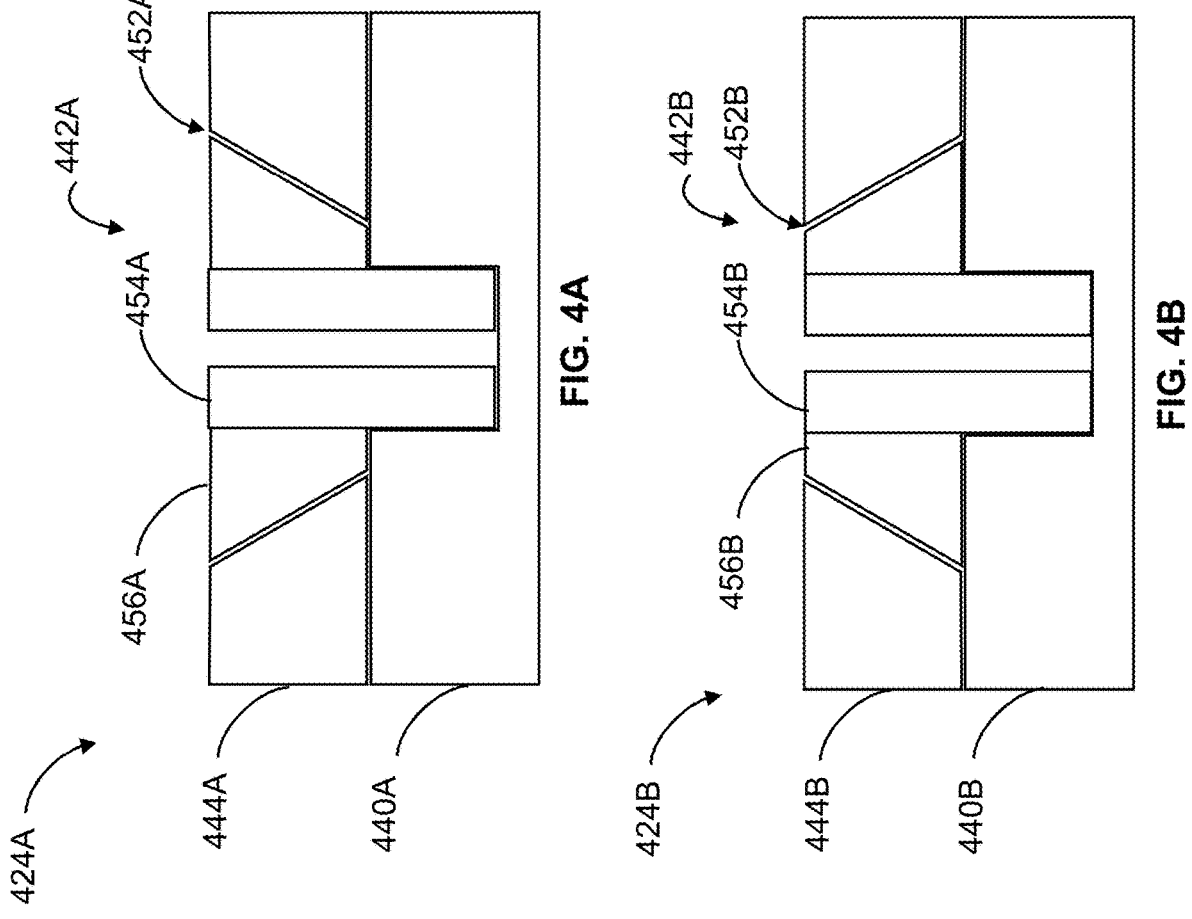
FIGS. 4A and 4B are conceptual diagrams illustrating example helix assemblies that include tapered rollers and roller tracks.

FIGS. 4A and 4B are conceptual diagrams illustrating example helix assemblies 424A and 424B that include tapered roller tracks 452A and 452B. Helix assemblies 424A and 424B and roller tracks 452A and 452B may be the same as or substantially similar to helix assembly 324 and roller tracks 352 described above in reference to FIGS. 3A through 3C, except for the differences described herein.

In reference to FIG. 4A, helix assembly 424A includes a roller 442A having a roller post 454A extending axially from proximal end coupled to a roller sleeve 440A to a distal end to which a roller 456A is coupled. Roller 456A may include a bearing, a metal, or a polymeric material defining a frustum (e.g., having trapezoidal cross section). Relative to a plane extending normal to an exterior surface of the sidewall helix 444A, roller 456A may define surface tapered toward a centerline of roller assembly 442A between about 1 degree and about 45 degrees, such as between about 10 degrees and about 30 degrees. Roller track 452A defined by a sidewall of helix 444A may define a corresponding tapered cross section.

The tapered profiles of roller 456A and roller track 452A may improve the transfer of force between roller 465A and helix 444A at various axial positions of roller 456A relative to roller track 452A, reduce scrubbing, or both. One example of a benefit of a taper configured such as depicted in FIG. 4A includes that the smaller roller diameter is disposed towards the center of the clutch rotational axis which minimizes the relative slipping and motion between track 452A and roller 456A as roller 456A traverses along the angled helical track 452A. It does this because at any helix angle besides 0-degrees (i.e., a track parallel with clutch axis) there is rotation of the roller assembly about the clutch axis. Because roller 456A contact on the helical ramp of track 452A extends from a smaller first diameter close to the inner diameter of helix 444A outward to a larger second diameter, near the outer diameter of helix 444A, the twisting rotation of roller assembly 442A along track 452A causes the outer edge section of roller 456A to traverse a longer distance than the inner edge. Since the angular rotation of roller assembly 442A will necessarily be the same for both the inside and outside edges of roller 456A, the only way to manage the discrepancy in linear travel distance along the helical track 452A (ID of track vs OD) is to have an increased roller diameter in the radially outward section of roller 456A. In this manner, for a constant angle of helix wrap, there exists an ideal roller angle to have a zero or near zero scrub condition across the entire height of contact of the roller-helix contact patch as roller 456A travels along track 452A of helix 444A.

As illustrated in FIG. 4B, helix assembly 424B includes a roller 442B having a roller post 454B extending axially from proximal end coupled to a roller sleeve 440B to a distal end to which a roller 456B is coupled. Roller 456B may include a bearing, a metal, or a polymeric material defining a frustum (e.g., having trapezoidal cross section). Relative to a plane extending normal to an exterior surface of the sidewall helix 444B, roller 456B may define surface tapered away from a centerline of roller assembly 442B between about 1-degree and about 45-degrees, such as between about 10-degrees and about 30-degrees. Roller track 452B defined by a sidewall of helix 444B may define a corresponding tapered cross section. The tapered profiles of roller 456B and roller track 452B may improve the transfer of force between roller 465B and helix 444B at various axial positions of roller 456B relative to roller track 452B, reduce scrubbing, or both. For example, if the sliding/relative motion between helix 444B and roller 456B is considered acceptable to helix and roller wear and designs, the inverted angle would prevent the roller from causing excessive wear on helix 444B due to the relative motion between roller and helix sleeve and centripetally applied force due to clutch rotation.

Nested Helix Triple Shaft Seal Driven

As discussed above, the driven clutch system described herein includes a bell-shaped movable sheave defining a waist that can receive therein at least a portion of the helix assembly, and a bell-shaped stationary sheave defining a waist that can receive therein at least a portion of movable sheave. For example, at least a portion of the helix may be positioned outboard of the inner diameter of the belt contact surface of the movable sheave in an overdrive configuration and a substantial portion of the helix may be positioned within the movable sheave in an idle configuration. This nested configuration provides for a center of mass of the driven clutch to be located closer to the transmission support bearing (i.e., reducing overhang), thereby increasing the available operating speed of the driven clutch without substantial oversizing of the shaft diameter and reducing shaft natural frequency at high revving engine speeds. In some examples, the high mass components, such as the helix, may be positioned as close as possible to the transmission support bearing, further helping move the driven clutch center of mass inboard.

Moreover, the nested configuration described herein allows for the use of all grease lubricated bushings and rollers for improved durability compared to dry-type secondary clutches. For example, by avoiding oversizing of the shaft diameter, lip speeds of the input shaft seal may be kept within a threshold acceptable speed. Thus, enabling static and dynamic seals to be used economically to provided for a sealed, lubricated volume containing the helix and roller assemblies.

Figures 5A, 5B:
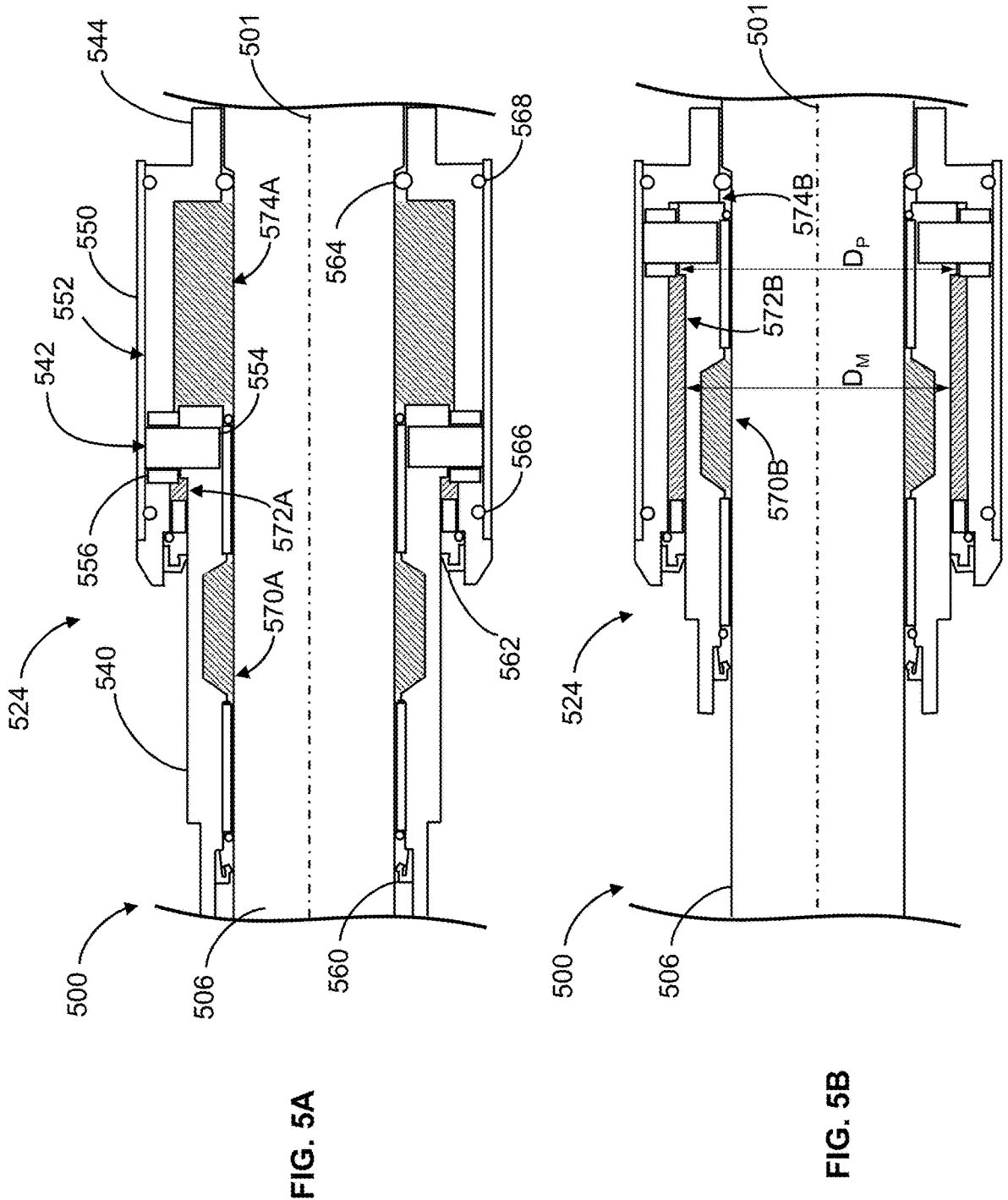
FIGS. 5A and 5B are conceptual diagrams illustrating a cross section of a portion of an example driven clutch including a lubricant sealed helix assembly in an idle configuration and an overdrive configuration, respectively.

FIGS. 5A and 5B are conceptual diagrams illustrating a cross section of a portion of an example driven clutch 500 including a lubricant sealed helix assembly 524 in an idle configuration and an overdrive configuration, respectively. Driven clutch 500 may be the same as or substantially similar to driven clutch 24 and/or 200 described above in reference to FIGS. 1A through 2G, except for the differences described herein. Additionally, helix assembly 524 may be the same as or substantially similar to helix assemblies 48, 224, 324, or 424 described above in reference to FIGS. 1A through 4B, except for the differences described herein.

Driven clutch 500 includes a stationary sheave (not illustrated) coupled to post 506 that extends along a drive axis 501, and a movable sheave (not illustrated) that is coupled to a movable portion of a helix assembly 524. Helix assembly 524 includes a roller sleeve 540, a plurality of roller assemblies 542, a helix 544, a helix sleeve 250, a spring cup and a spring (not illustrated). Roller assemblies 542 each include a roller post 554 having a proximal portion coupled to roller sleeve 540 and a distal portion to which a roller 556 is coupled. Roller 556 is configured to travel within a roller track 552 defined by a sidewall of helix 544.

Helix assembly 524 includes a plurality of dynamic seals and static seals that are configured to define a lubricant sealed volume between at least a portion of post 506 and helix sleeve 550. For example, helix assembly 524 includes dynamic seals 560 and 562 as well as static seals 564, 566, and 568. Dynamic seal 560 is configured to seal between a radially interior surface of roller sleeve 540 and post 506 while enabling roller sleeve 540 to axially translate along post 506. Dynamic seal 562 is configured to seal between a radially interior surface of helix 544 and a radially exterior surface of roller sleeve 540 while enabling roller sleeve 540 to axially translate relative to helix 544 which is fixed to at least a portion of post 506. Dynamic seals 560 and 562 may include any suitable type of dynamic seal such as a wiper seal or the like. Dynamic seals 560 and 562 may include any suitable type of material such as a synthetic rubber, silicon, polyurethane, or other polymeric material. In some examples, dynamic seals 560 and 562 may include a sealing threshold within a range from about 1 pounds to square inch (psi) to about 50 psi, such as about 7 psi to about 10 psi.

Static seals 564, 566, and 568 do not move when helix assembly axially translates. Static seal 564 is configured to seal between a radially interior surface of helix 544 and post 506. Static seals 566 and 568 are configured to seal between a radially interior surface of helix sleeve 550 and a radially exterior surface of helix 544. For example, static seal 566 is coupled to a distal portion of helix 544 and static seal 568 coupled to the proximal portion of helix 544. Helix 544 may define a distal circumferential recess and a proximal circumferential recess configured to receive respectively static seal 566 and static seal 568 such that a radially exteriors surface of static seal 566 and static seal 568 are configured to engage a radially interior surface of helix sleeve 550 to retain a fluid, such as a lubricant, within helix assembly 524. Static seals 564, 566, and 568 may include any suitable type of static seal such as an O-ring or the like. Static seals 564, 566, and 568 may include any suitable type of material such as a synthetic rubber, silicon, polyurethane, or other polymeric material. In some examples, static seals 564, 566, and 568 may include a sealing threshold within a range from about 1 pounds to square inch (psi) to about 50 psi, such as about 7 psi to about 10 psi.

Three-Shaft Seal Driven with More Constant Volume

A challenge with implementing a nested helix configuration may include operation of dynamic seals 560 and 562 on two shaft diameters. In some examples, the configuration of helix assembly 524 provides sufficient sealed volume, e.g., the lubricated helix cavity, to significantly reduce internal pressure build-up as driven clutch 500 shifts. For the described nested helix driven configuration, use of concentric shafts of varying diameters causes pressure to be built up within the sealed cavity because of the translation on different diameters. The effect can be substantial with internal pressures exceeding 30 psi. This internal pressure makes sealing the greased internal volume more challenging as conventional seal designs are typically rated for less than about 10 psi, which may result in grease leakage and/or seal damage. Additionally, the effect of pressure buildup on spring calibration is no longer negligible and as the pressure varies due to temperature, elevation, even beyond the pressure built up during shifting, clutch calibration and thus engine operating speeds can vary in an unintended fashion causing additional variation in CVT calibration.

To overcome these challenges, driven clutch 500 includes a sealed volume sufficiently large to allow for translation of helix assembly 524 while keeping the change in volume between the idle configuration and the overdrive configuration sufficiently small to prevent pressure within the volume from exceeding a selected threshold pressure, such as a threshold pressure of dynamic seals 560 and 562.

As illustrated in FIG. 5A, a sealed volume in the idle configuration may include a volume defined by shaded regions 570A, 572A, and 574A. The total volume in the idle configuration (i.e., the sum of 570A, 572A, and 574A) may be within a range from about 50 milliliters (mL) to about 500 mL. As illustrated in FIG. 5B, a sealed volume in the idle configuration may include a volume defined by regions 570B and 572B, with 574B being a negligible volume. The total volume in the overdrive configuration (i.e., the sum of 570B, 572B, and 574B) may be within a range from about 20 mL to about 200 mL. The volumes of regions 570A and 570B are substantially equal. The volume of region 570B is greater than the volume of region 570A due to a difference in diameter of a roller sleeve 540 at a medial region and a proximal region. For example, the medial region of roller sleeve 540 has a diameter DM which is less than a diameter DP at the proximal region of roller sleeve 540.

The total volume in the overdrive configuration may be less than the total volume in the idle configuration. In some examples, the total volume in the overdrive configuration may be greater than about 70% of the total volume in the idle configuration. The difference between the volume in the idle configuration and the volume in the overdrive configuration may be selected to reduce a pressure within the volume in overdrive configuration to less than about 10 psi, such as less about 7 psi or less than about 5 psi.

In some examples, post 506 may define a cavity that is fluidly coupled to the volume defined by helix assembly 524. Fluidly coupling the volume defined by helix assembly 524 to the cavity defined by post 506 may enable pressure testing of helix assembly 524 after installation of helix assembly 524 on post 506. For example, a lubricant such as grease may be packed or otherwise injected into at least a portion of regions 570A, 572A, and 574A prior to installation of helix assembly 524 on post 506. After installation of helix assembly 524 on post 506, helix assembly 524 may be pressure tested. In some examples, the cavity defined by a bore in post 506 may contribute to the total volumes defined above. In this way, the volume of the bore in post 506 may be selected to provide the desired pressure deferential between the idle configuration and the overdrive configuration.

Unitary Fixed Spline Driven Stationary

Wear of CVT components also may occur at the interface of a drive shaft and pulley (i.e., a drive clutch unit or driven clutch unit). Variation in the fitment of the spline of a drive shaft with a pulley or other variations in component manufacturing may result in orbiting of a pulley which may accelerate wear of a spline. The disclosure describes unique pulley-shaft spline configurations, such as those used for CVT or V-belt pulleys, for transmitting rotational torque and requiring a high level of constraint to resist and bending moments due to applied loads that are substantially parallel to the shaft rotational axis and offset by a diametral distance.

FIGS. 6A through 6D are conceptual diagrams illustrating a portion of an example CVT pulley 600. Pulley 600 includes a stationary sheave 602, which may be the same as or substantially similar to stationary sheaves 24 and/or 202 described above in reference to FIGS. 1A thought 2G. Although illustrated as including stationary sheave 602, the pulley-shaft spline configurations may be used on other CVT or V-belt systems.

Figures 6A, 6B:
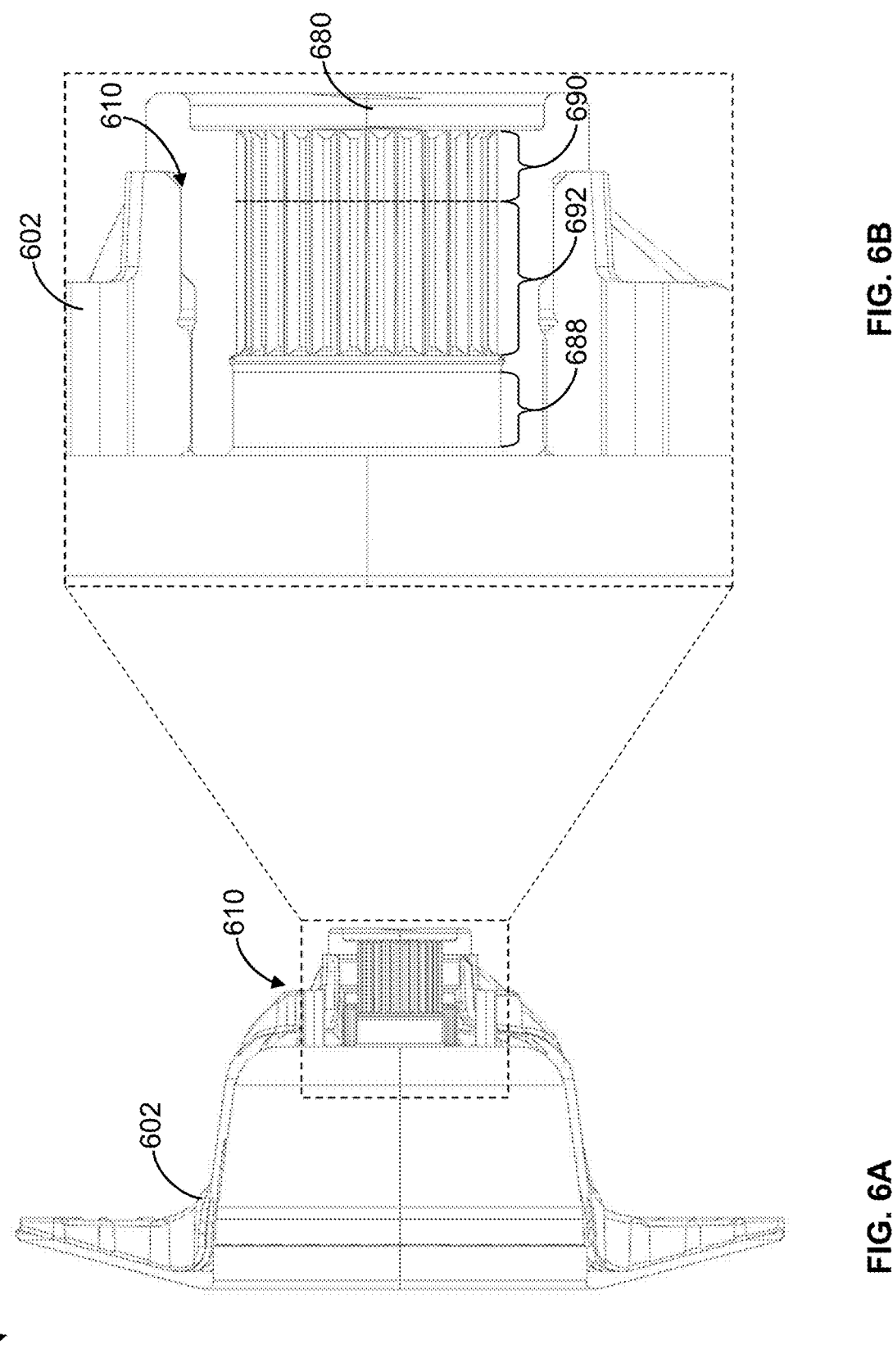
FIGS. 6A through 6D are conceptual diagrams illustrating a portion of an example CVT pulley.
Figure 6D:
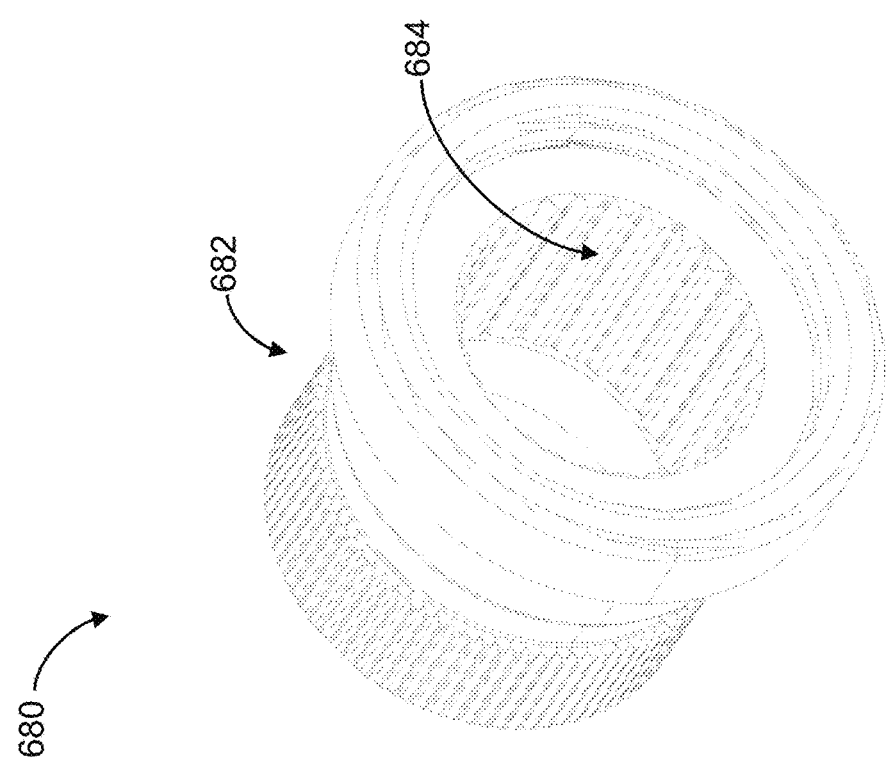
Figure 6C:
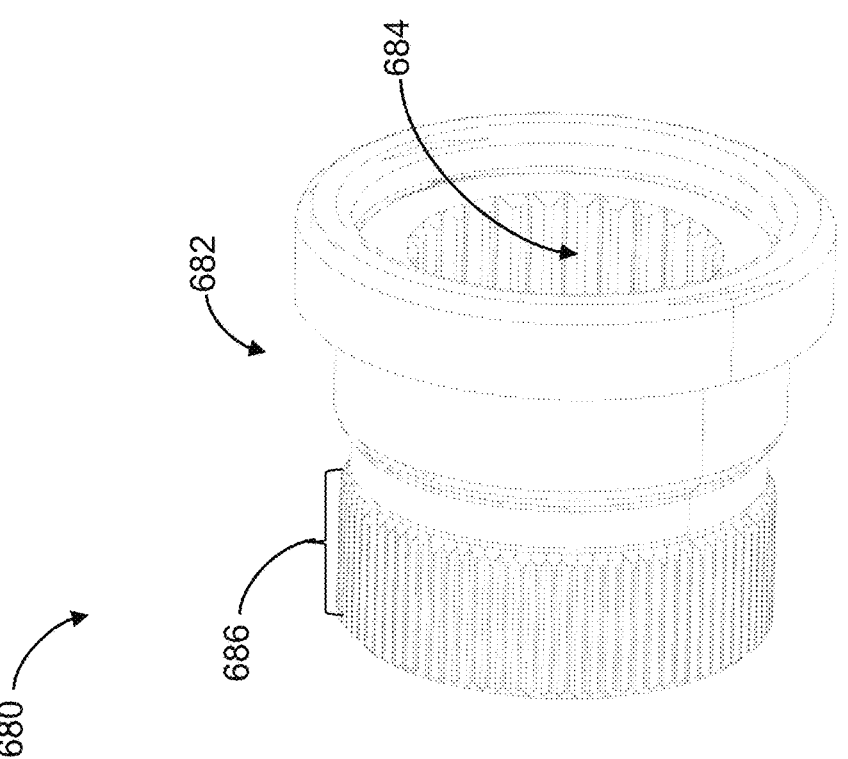

Distal portion 610 of stationary sheave 602 defines an aperture 611 that is configured to receive therein a hub 680. In some examples, stationary sheave 602 and hub 680 may be integrally formed. Hub 680 includes a hollow cylinder having a radially exterior surface 682 and a radially interior surface 684 (FIG. 6C). Radially exterior surface 682 defines a male spline portion 686 which is configured to couple with a female spline portion defined by at least part of the distal portion 610 of stationary sheave 602. In this way, torque is transmitted from stationary sheave 602 to hub 680.

Radially interior surface 684 of hub 680 is configured to mechanically couple to a shaft spline such as a male spline portion of a drive shaft or a post (e.g., post 206). In this way, torque is transmitted from hub 680 to the shaft spline. To improve fitment and torque transmission, radially interior surface 684 includes a proximal first journal region 688, a distal second journal region 690, and a unitary spline 692 as a torque transmission region disposed between and directly adjacent to first journal region 688 and second journal region 690. First journal region 688 and second journal region 690 provide constraint for the bending moments of stationary sheave 602.

First journal region 688 defines a diameter sized equal to or slightly larger than the shaft spline major diameter. Second journal region 690 defines a diameter sized equal to or slightly larger than the minor diameter of the spline on radially interior surface 684 of sheave coupling 680. Alternatively, second journal region 690 defines a diameter sized equal to or slightly larger than the shaft spline minor diameter. As used in reference to journal diameters, an actual diameter equal to or slightly larger than a selected diameter may include variation due to tolerances in conventional spline machining techniques or selected variations to improve assembly, such as, for example, within about 1 millimeter (mm) of the selected diameter, within about 0.5 mm of the selected diameter, or within about 0.05 mm of the selected diameter.

The above-described selection of the journal diameters provides several benefits. First, accuracy of the journal diameters can be achieved on the spline shaft through grinding or machining without going over an interrupted cut of the male spline. Second, the axial position of hub 680 relative to the spline shaft may be more accurately controlled compared to use of broaching splines or by pressing in additional spacer adapters. Third, the design does not require additional components, such as spacers or bushing-type adapters to compensate for spline broach clearance, therefore, assembly complexity and cost is reduced. By enable improve journal diameter machining and enhanced positional accuracy, the design of first journal diameter 688, second journal diameter 690, and unitary spline 692 on hub 680 enhance resistance to bending moments and orbiting, as well as significantly reduced spline wear, compared to other spline designs. Additionally, the reduction in bending moments, orbiting, and spline wear enables the spacing between first journal 688 and second journal 690 to be reduced relative to other designs without a sacrifice in running accuracy. As such, the axial length of hub 680 may be reduced to improve packaging of a CVT.

Off-Road Vehicle Equipped with Anti-Wear CVT Components

CVT wear typically manifests in the form of premature belt failure and overall CVT system performance loss. For example, a first CVT belt may be operated a first number of miles or hours of operation (e.g., 4000 miles) before a perceived loss in performance, such as a jerky drive off or inconsistently high and low engine speed. After the perceived loss in performance, the first CVT belt may fail and require replacement. A second replacement CVT belt may temporarily return performance but may fail after a second number of miles or hours of operation (e.g., 300 miles), which is substantially less than the first number of miles or hours of operation. This premature belt failure may, in some instances, result from the formation of grooves in the sheaves of the CVT and wear to the translating components. To address these challenges, an anti-wear coating may be applied to one or more components of a CVT, such as belt contact surfaces of stationary and movable sheaves to increase the useable life of CVT components and reduce or prevent the formation of surface features, such as grooves or galls, that may result in premature belt failure.

Figure 7:
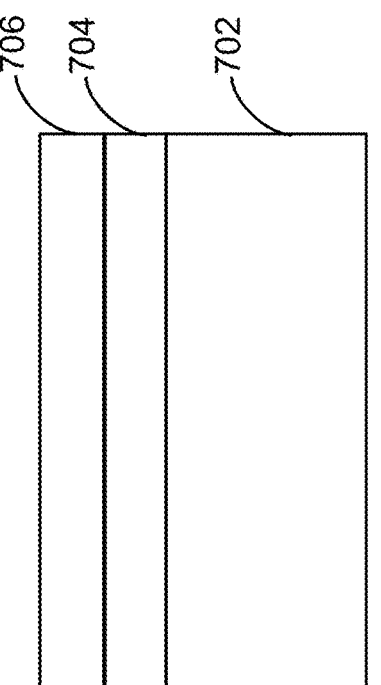
FIG. 7 is a conceptual diagram illustrating cross sectional views of a portion of a CVT component including an anti-wear coating disposed on a substrate.

FIG. 7 is a conceptual diagram illustrating cross sectional views of a portion of a CVT component 700 including an anti-wear coating 706 disposed on a substrate 702. CVT component 700 may include any component of a CVT system such as, for example, a stationary sheave, a movable sheave, a helix, a roller assembly, a roller sleeve, a spider, wear components, or other components that may experience wear as the result of continuous or intermittent translation across other components.

As used in reference to FIG. 7, wear may include a three-body wear system, a two-body wear system, or both. A three-body wear system may result from ingestion of a foreign body, such as silica sand or other debris, whereby the foreign body is lodged between an interface of a first component and a second component and causes wear of either or both of the first and second component. For example, sand may be temporarily lodged between a metal sheave and a CVT rubber belt, which is hundreds of times softer than the metal sheave or silica sand, resulting in wear of the CVT rubber belt. A two-body wear system may result when a first component includes materials that are hard enough to cause wear of a second component. For example, a CVT rubber belt may include rubber with embedded aramid or carbon fibers, which are abrasive to the metal of the sheave, such that rotation of the belt about the sheave causes the aramid or carbon fibers to form grooves in the sheave. Failure modes associated with both two-body and three-body wear systems may include, but are not limited to, galling and grooving of the translating surfaces, wear of the translating components, and groove shaped wear of rotating components.

Substrate 702 may include one or more metals, one or more polymers, or combinations therefore. In examples in which CVT component 700 includes a sheave, substrate 702 may include an iron alloy or an aluminum alloy. Additionally, substrate 702 may be representative of at least one of the first belt contact surface and the second belt contact surface of the sheave.

In some examples, an optional bond coat 704 may be disposed between substrate 702 and anti-wear coating 706. Bond coat 702 may improve adhesion of the anti-wear coating 706. In some examples, bond coat 702 may have a coefficient of thermal expansion that is between a coefficient of thermal expansion of substrate 702 and anti-wear coating 706, which may reduce spallation of the anti-wear coating 706 during thermal cycling of CVT component 700.

Anti-wear coating 706 includes a material configured to increase the hardness of CVT component 700. In some examples, anti-wear coating 706 may include at least one of electroless nickel, tungsten carbide, and a hard-coat oxidation layer. Anti-wear coating 706 may improve a wear life of CVT component 700 by at least a factor of two, such as a factor of five or eight.

Using the anti-wear coating may enable vehicle components to rotate at higher rates while maintaining a selected wear rate. Therefore, vehicle performance may be increased without a corresponding increase in the wear of a component.

Windage Plate with Curved Form at ID

CVT systems may include windage plates positioned on a finned surface of a sheave opposing the belt contact surface of the sheave. Fins of the finned surface are configured to cause air cooling, ejection of airborne debris, or both of components of a CVT, as discussed above in reference to FIGS. 2A though 2G. Conventional windage plates may include a planar plate fixed to the finned surface to further direct air movement, e.g., from a central intake radially outward. Conventional windage plates, however, do not limit radial back flow or recirculation of air within a covered clutch system, therefore, there is a need to improve fresh air intake while reducing recirculation.

FIGS. 8A through 8G are conceptual diagram illustrating an example driven clutch 800 including windage plates 822 and 838 that are configured to improve fresh air intake at all shift positions. Driven clutch 800 may be the same as or substantially similar to driven clutch 200 described above in reference to FIGS. 2A through 2G, except for the differences described herein. Driven clutch 800 includes a stationary sheave 802 having a windage plate 822 and a movable sheave 804 having a windage plate 838. Other components of driven clutch 800 are removed for clarity.

Figures 8A, 8B:
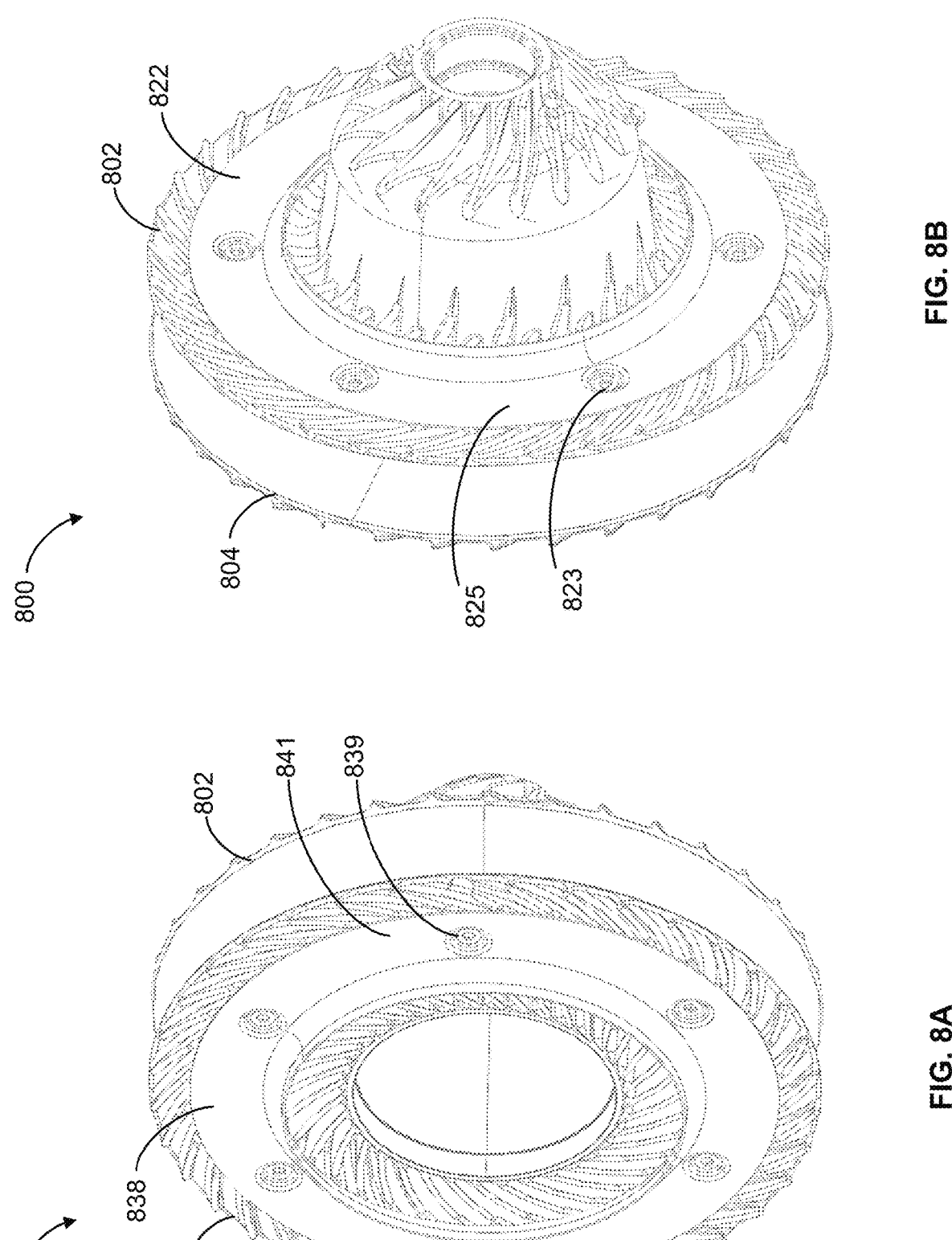
FIGS. 8A through 8G are conceptual diagrams illustrating an example driven clutch including windage plates that are configured to improve fresh air intake at all shift positions.

As illustrated in the front and back perspective view of FIGS. 8A and 8B, windage plates 822 and 838 are fixed to respective sheaves via a plurality of fasteners, e.g., fastener 839 and 823. For example, windage plate 838 of movable sheave 804 defines a radially extending annulus 841 coupled to a proximal surface of movable sheave 804. Similarly, windage plate 822 of stationary sheave 802 defines a radially extending annulus 825 coupled to a distal surface of stationary sheave 802. In some examples, the respective sheaves may define threaded apertures positioned at ridges of select fins. As such, windage plates 822 and 838 may be secured to the plurality of fins defined by the respective sheaves.

Figure 8D:
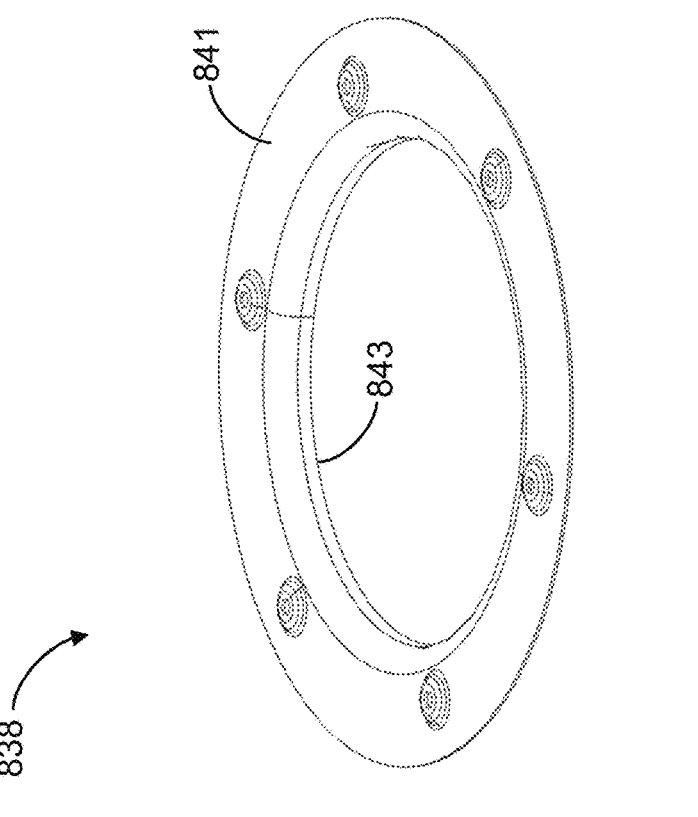
Figure 8D:
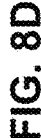
Figure 8C:
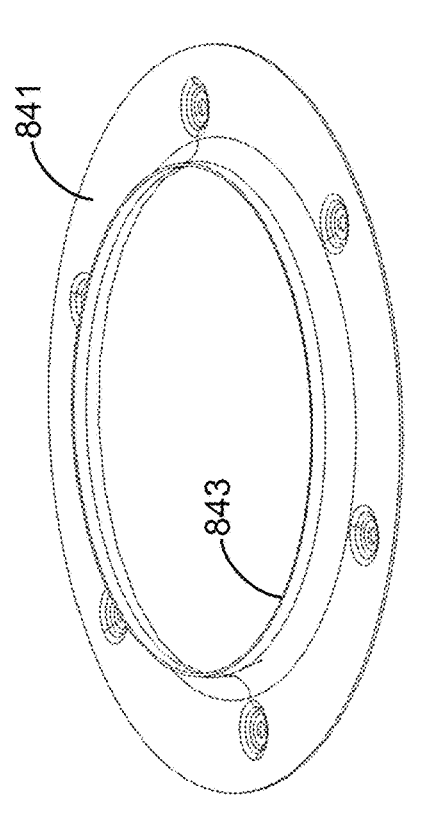

As illustrated in the top and bottom perspective views of FIGS. 8C and 8D, windage plate 838 includes a deflector portion 843. Deflector portion 843 may be integrally formed with and extends from radially extending annulus 841. Deflector portion 843 defines a curved transition from the radially extending annulus 841 to an axially extending proximal edge. In some examples, from a plane defined by annulus 841, deflector portion 843 extends axially a distance within a range from about 5 mm to about 40 mm, such as from about 5 mm to about 20 mm, or about 12 mm. Windage plate 822 includes a substantially similar deflector portion.

Deflector portion 843 is configured to reduce recirculation of air within a clutch cover and to improve intake of fresh air from an intake manifold. For example, existing air within a clutch cover may travel radially inward toward deflector portion 843, but rather than being recirculated, deflector portion 843 deflects the air in an axial direction. Moreover, fresh air traveling from the intake manifold that is substantially coaxial with the deflector portion travels axially past deflector portion 843.

Figure 8F:
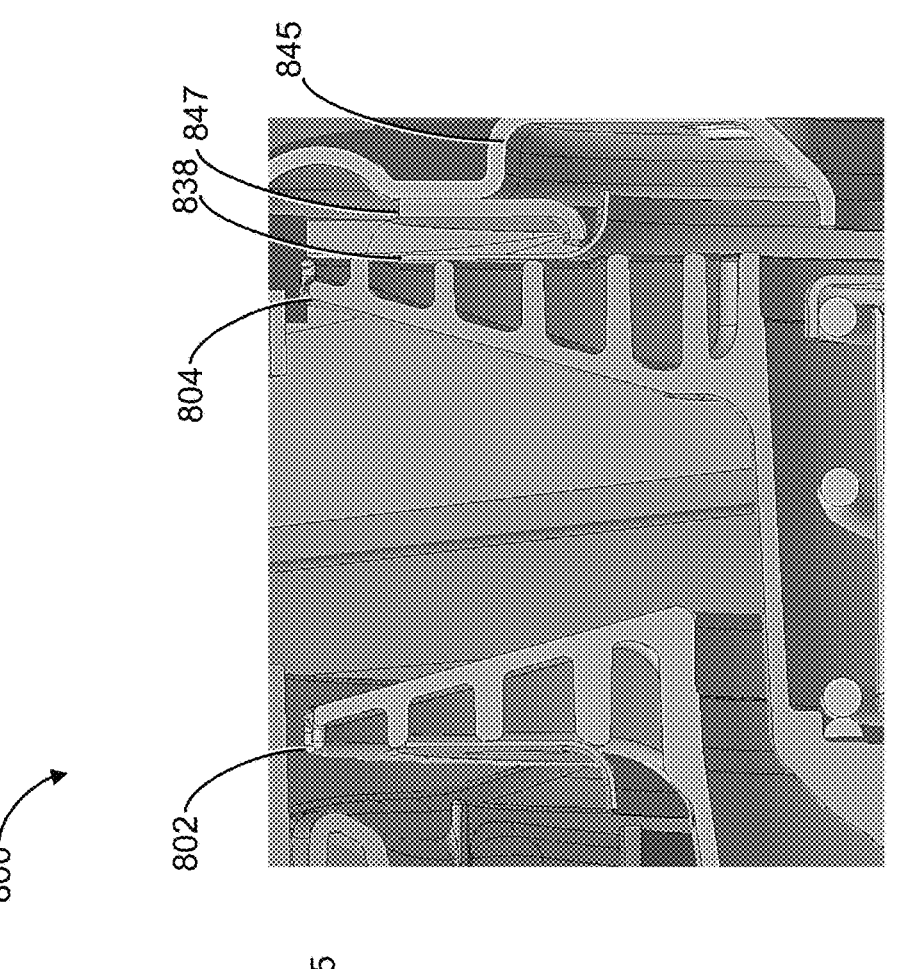
Figure 8E:
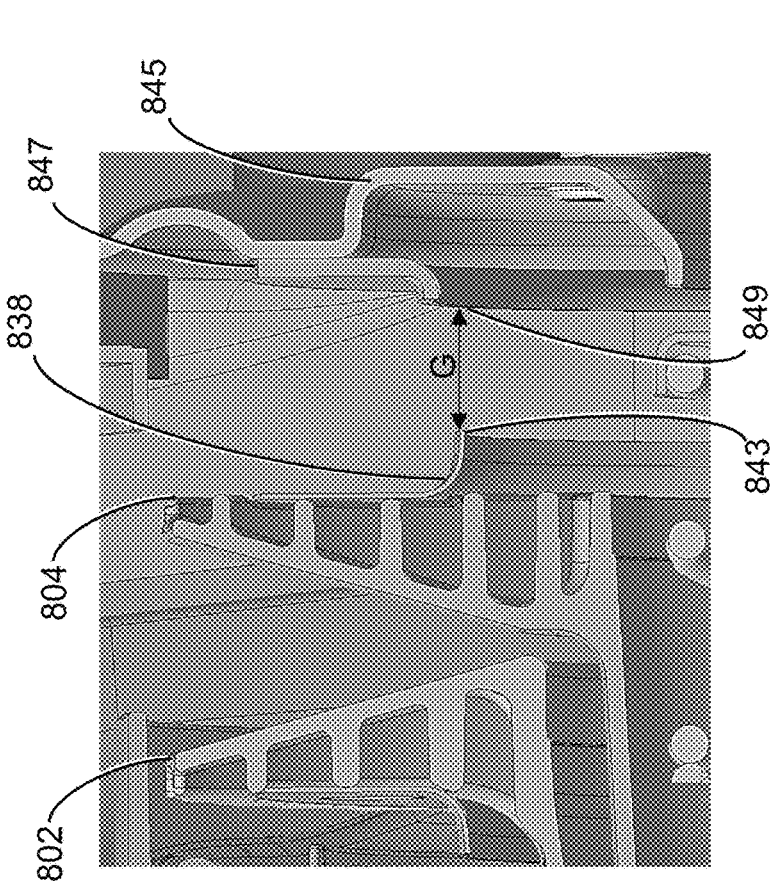

As illustrated in the cross-sectional views of FIGS. 8E and 8F, a clutch cover 845 may include a corresponding windage plate 847. Windage plate 847 may be the same as or substantially similar to windage plate 838. For example, windage plate 847 may include a deflector portion 849 extending axially from an annular portion. Windage plate 847 may further reduce recirculation of air within a clutch cover and to improve intake of fresh air from an intake manifold.

As illustrated in FIG. 8E, when driven clutch 800 is in the overdrive configuration, there may be a gap G between the axial edges of windage plates 838 and 847. In other examples, there may be no or a minimal gap G. For example, when a distance between movable sheave 804 and clutch cover 845 is 40 mm, each of deflector portions 843 and 849 may extend from the respective annulus approximately 20 mm such that in the overdrive configuration the gap G is approximately zero. Reducing the gap G may reduce recirculation of air within a clutch cover and improve intake of fresh air from an intake manifold.

As illustrated in FIG. 8F, when driven clutch is in the idle configuration, deflector portions 843 and 849 may overlap. When overlapped, deflector portion 849 is radially offset from deflector portion 843 to provide clearance between the rotating deflector portion 843 and stationary deflector portion 849. In some examples, the clearance may be at least 2 mm, such as at least 4 mm.

Figure 8G:
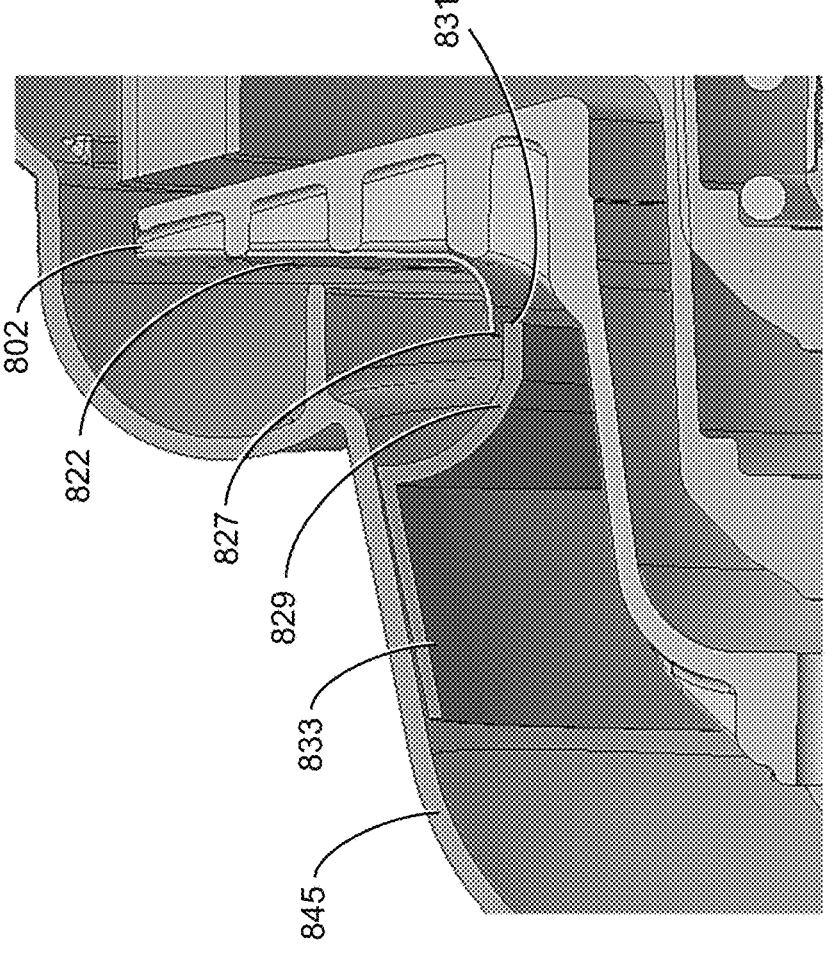

As illustrated in the cross-sectional views of FIG. 8G, a clutch cover 845 may include a windage plate 829 corresponding to windage plate 822 of stationary sheave 802. Windage plate 829 may be the same as or substantially similar to the other windage plates described herein. For example, windage plate 829 may include a deflector portion 831 extending axially from an annular portion 833. Similarly, as discussed above, windage plate 829 may further reduce recirculation of air within a clutch cover and improve intake of fresh air.

Enclosure Air Paths

FIGS. 9A through 9E are conceptual diagrams illustrating an example CVT enclosure 900 (hereinafter, enclosure 900) configured to improve fresh air intake to maximize sheave cooling and system efficiency. Enclosure 900 includes an inboard cover 902 and an outboard cover 904. Enclosure 900 has a single inlet 906, which includes a first port 908 and a second port 910. First port 908 and second port 910 routes clean, cool air to each of the three air pumps defined the components of the CVT (i.e., fins defined by the drive clutch stationary and/or movable sheaves and the driven clutch stationary and/or moveable sheaves act as centrifugal air pumps by which air is routed to the inner diameter of the sheave where it centrifuges out along the radial vanes of the sheaves).

In some examples, first port 908 is disposed on an inboard side of inlet 906 and directs air toward volutes adjacent inboard components of the drive clutch and/or driven clutch, e.g., the stationary sheave of the drive clutch and the moveable sheave of the driven clutch. In some examples, second port 910 is disposed on an outboard side of inlet 906 and directed air toward a volute adjacent outboard components of the drive clutch and/or driven clutch, e.g., the stationary sheave of the driven clutch. In some examples, the relative size of first port 908 and second port 910 (i.e., the area of the aperture defined by the respective ports) may be controlled to provide a selected volume of air flow through each of first port 908 and/or second port 910 during one or more periods of operation (i.e., overdrive, underdrive, and/or one or more operational periods therebetween).

Figure 9B:
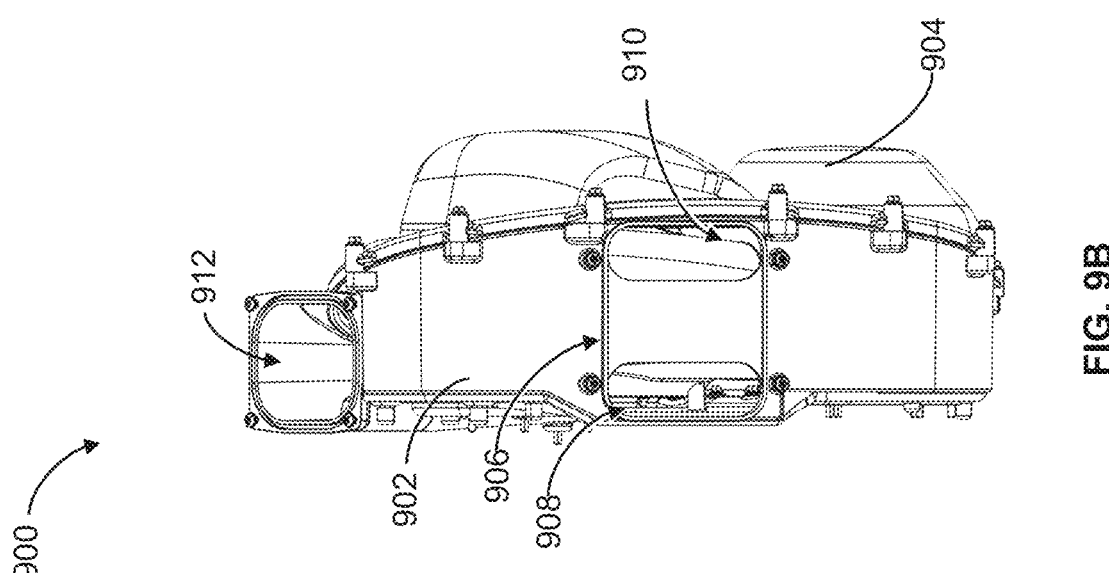
FIGS. 9A through 9E are conceptual diagrams illustrating an example CVT covers and baffles that are configured to improve fresh air intake.
Figure 9A:
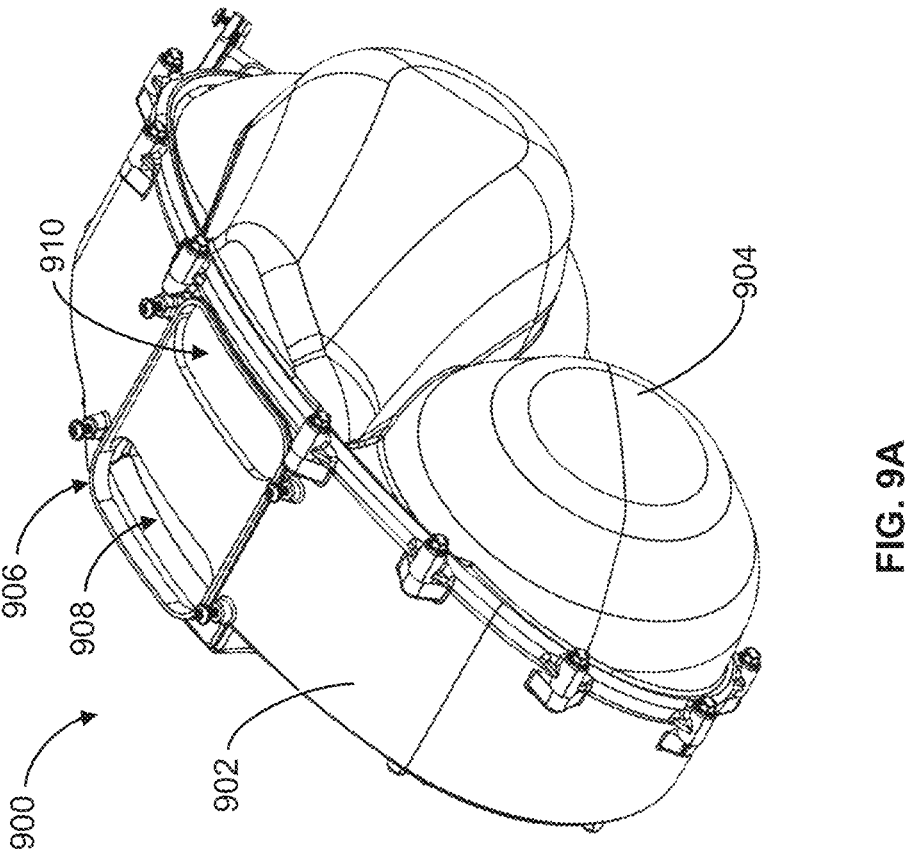
Figure 9C:
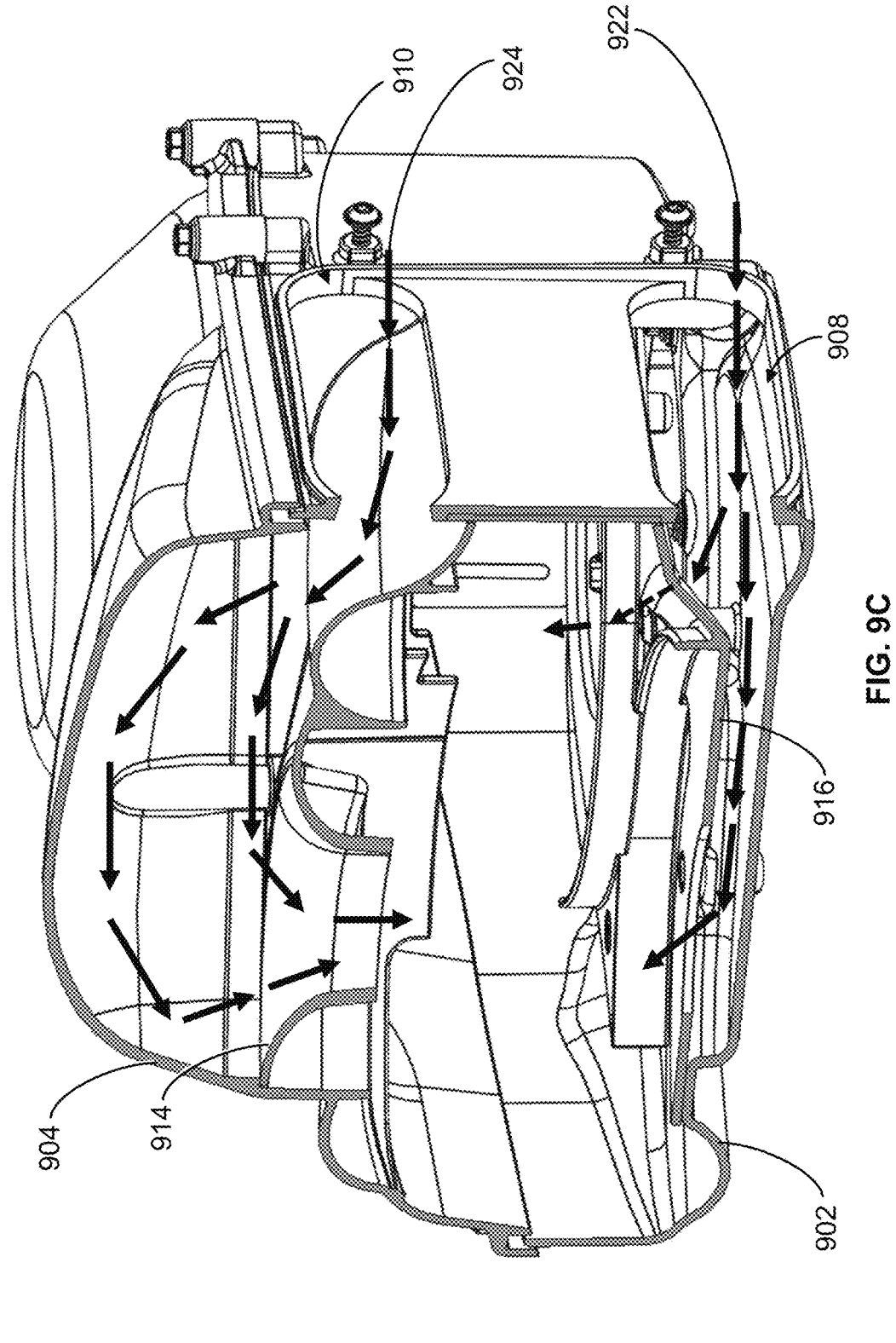

As illustrated in FIG. 9C, air entering first port 908 is drawn through a channel between inboard cover 902 and inboard baffle 916 along a flow path indicated by arrows 922 toward the inboard sides of the drive clutch stationary sheave and the driven clutch moveable sheave. Additionally, air entering second port 910 is drawn through a channel between outboard cover 904 and outboard baffle 914 along a flow path indicated by arrows 924 toward the outboard side of the driven clutch stationary sheave. The respective volutes defined by each of inboard cover 902 and inboard baffle 916 as well as outboard cover 904 and outboard baffle 914 are configured to convert the kinetic energy of the air into pressure and to separate the flow paths from each of the centrifugal pumps such that the air paths do not mix and create additional pumping losses. Outboard baffle 914 includes a top portion configured to route the air to the outboard driven stationary sheave and a bottom portion that serves as the expansion volute into the drive movable sheave. Inboard baffle 916 is configured such that clean air feeds both the inboard drive pump, and the driven pump. In some examples, there is more volume on the outboard side compared to the inner portion, so more work may be required to move air on the inboard side.

Figure 9D:
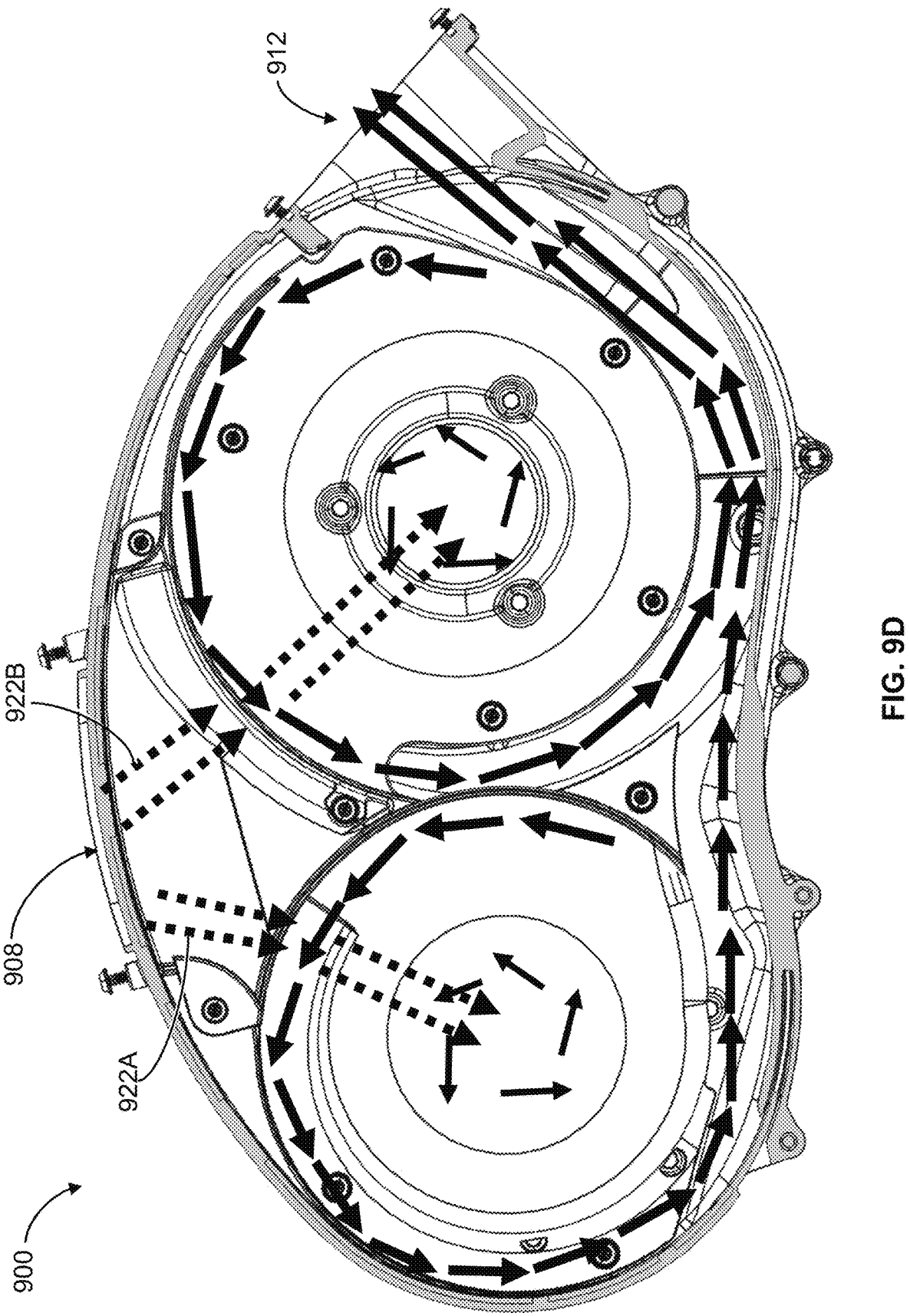

FIG. 9D illustrates another example view of the air flow paths in enclosure 900. As indicated by the dashed arrows 922A and 922B (collectively, arrows 922, as discussed above), air is drawn through first port 908 and directed toward the inboard sides of the drive clutch stationary sheave and the driven clutch moveable sheave. The air is pumped from a central portion of the respective drive clutch stationary sheave and the driven clutch moveable sheave toward respective volutes defined by enclosure 900 (e.g., outboard cover 904 and outboard baffle 914. A central portion of outboard baffle 914 extending between drive clutch stationary sheave and the driven clutch moveable sheave separates the respective volutes to improve pumping efficiency by reducing interference of opposing air flow paths compared to CVT enclosures without baffles. By separating each of the air paths into their unique volutes, the air flow paths do not work against each other, which improves system cooling performance and reduces the pumping losses (i.e., increases efficiency). Additionally, air path turns are reduced compared to unbaffled enclosures, which reduces the amount of work the pumps perform in moving the air to the sheave fins. Furthermore, outboard baffle 914 becomes an integral part of the cooling system by allowing the outboard air to travel to the center of the driven stationary sheave; but also allowing the air to expand by incorporating an expanding radial and axial volute to handle the transition from the outer cover volute, to the drive movable sheave. Inboard baffle 916 improves upon unbaffled designs by allowing axial and radial expansion in the volutes as well as separating the flow paths from the drive stationary sheave and the driven movable sheave.

Figure 9E:
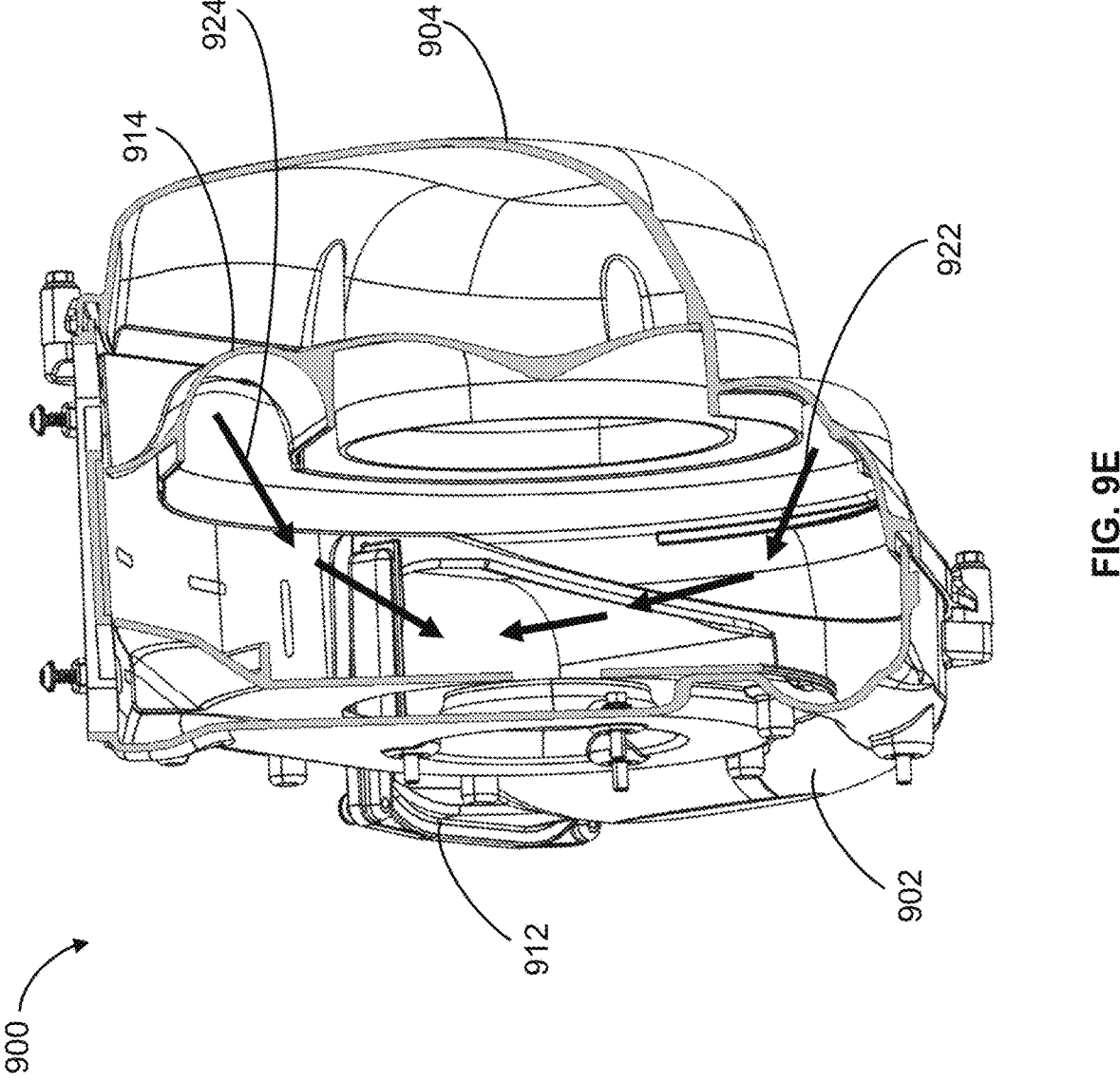

As illustrated in FIG. 9E, after traveling through the respective volutes, the air is then exhausted through outlet port 912. All air paths unite into a common exit to improve system integration and reduce component and manufacturing costs.

FIG. 9E illustrates outboard side air flow path. Air comes in through the center of the driven clutch and is centrifugal force outward and toward the drive clutch. The outboard baffle provides a wall that prevents the air flow around the driven clutch from interfering or otherwise working against the air flow of the air flow around the drive clutch.

Enclosure Containment

Figures 10A, 10B:
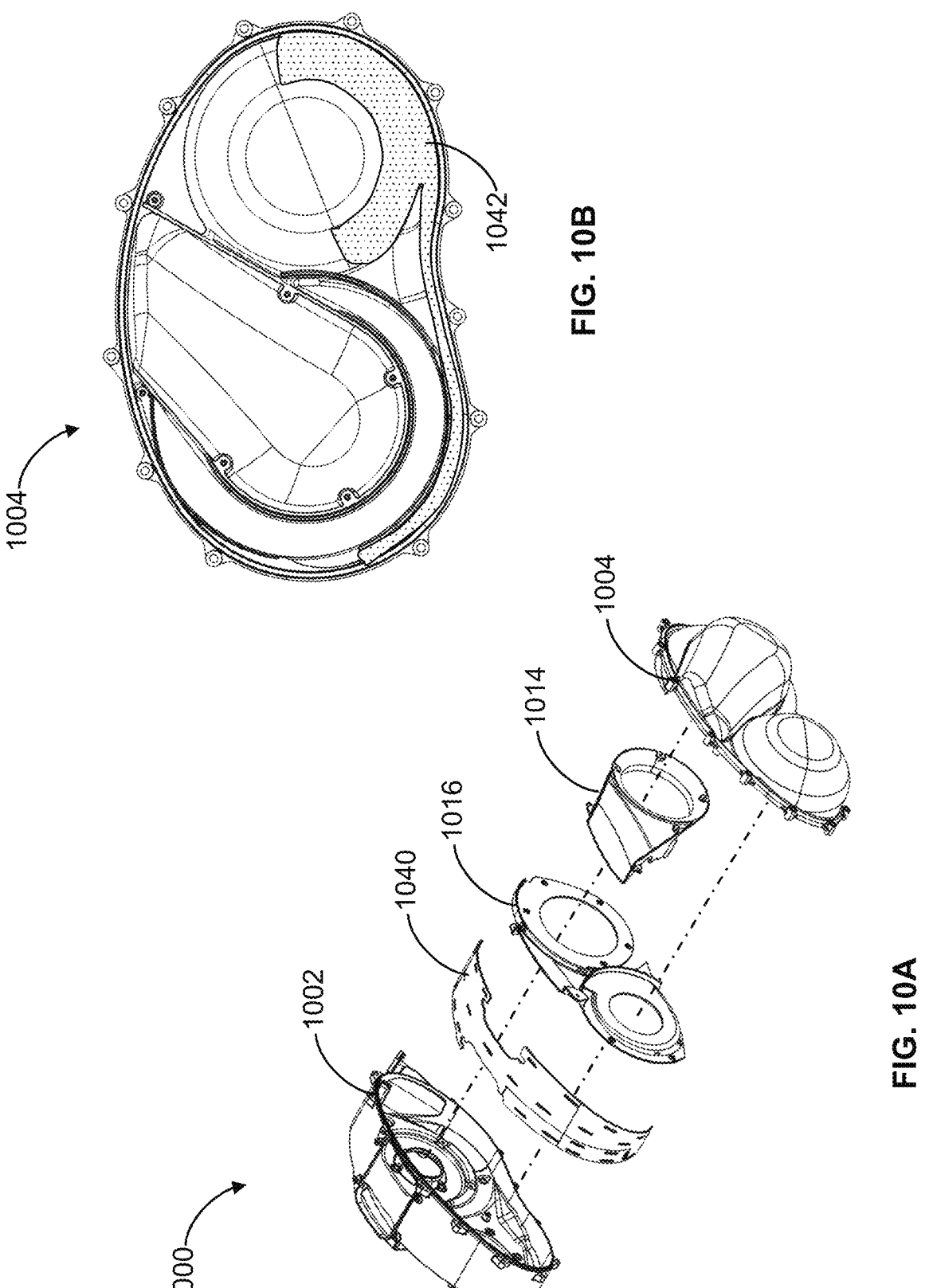
FIGS. 10A and 10B are conceptual diagrams illustrating an example CVT covers having reinforcing members integrated with polymeric cover members.

FIGS. 10A and 10B are conceptual diagrams illustrating an example CVT enclosure 1000 (hereinafter, enclosure 1000) having reinforcing members integrated with polymeric cover members, also referred to as containment shields or shields. The CVT system requires containment shields in the event a belt blow or clutch separation. The shielding configured to protect the fuel lines, brake lines, occupants, and the like from debris that may be produced during such events.

Enclosure 1000 may be the same or substantially similar to enclosure 900 described above in reference to FIGS. 9A through 9E, except for the differences described herein. For example, as illustrated in the exploded view of FIG. 10A, enclosure 1000 includes an inboard cover 1002, inboard baffle 1016, outboard cover 1004, and outboard baffle 1014. Additionally, enclosure 1000 includes first shield 1040 and second shield 1042. Unlike conventional shields that may include bolt-on sheet metal, first shield 1040 and second shield 1042 are integrated with inboard cover 1002 and outboard cover 1004, respectively.

In some examples, integration may include overmolding inboard cover 1002 and outboard cover 1004 on to respective metal components defining first shield 1040 and second shield 1042. Alternatively, metal components defining first shield 1040 and second shield 1042 may be adhered to inboard cover 1002 and outboard cover 1004 and optionally fastened with one or more mechanical fasteners, such as bolts or rivets. Compared to shields fastened to an exterior of an enclosure, integrating first shield 1040 and second shield 1042 internal to or on interior surfaces of respective inboard cover 1002 and outboard cover 1004, first shield 1040 and second shield 1042 may protect the plastic of the covers from belt blow events and serves as a composite structure for clutch separation events that a more robust compared to other designs having eternal shields.

Split Clutch Cover

Figures 11A, 11B, 11C:
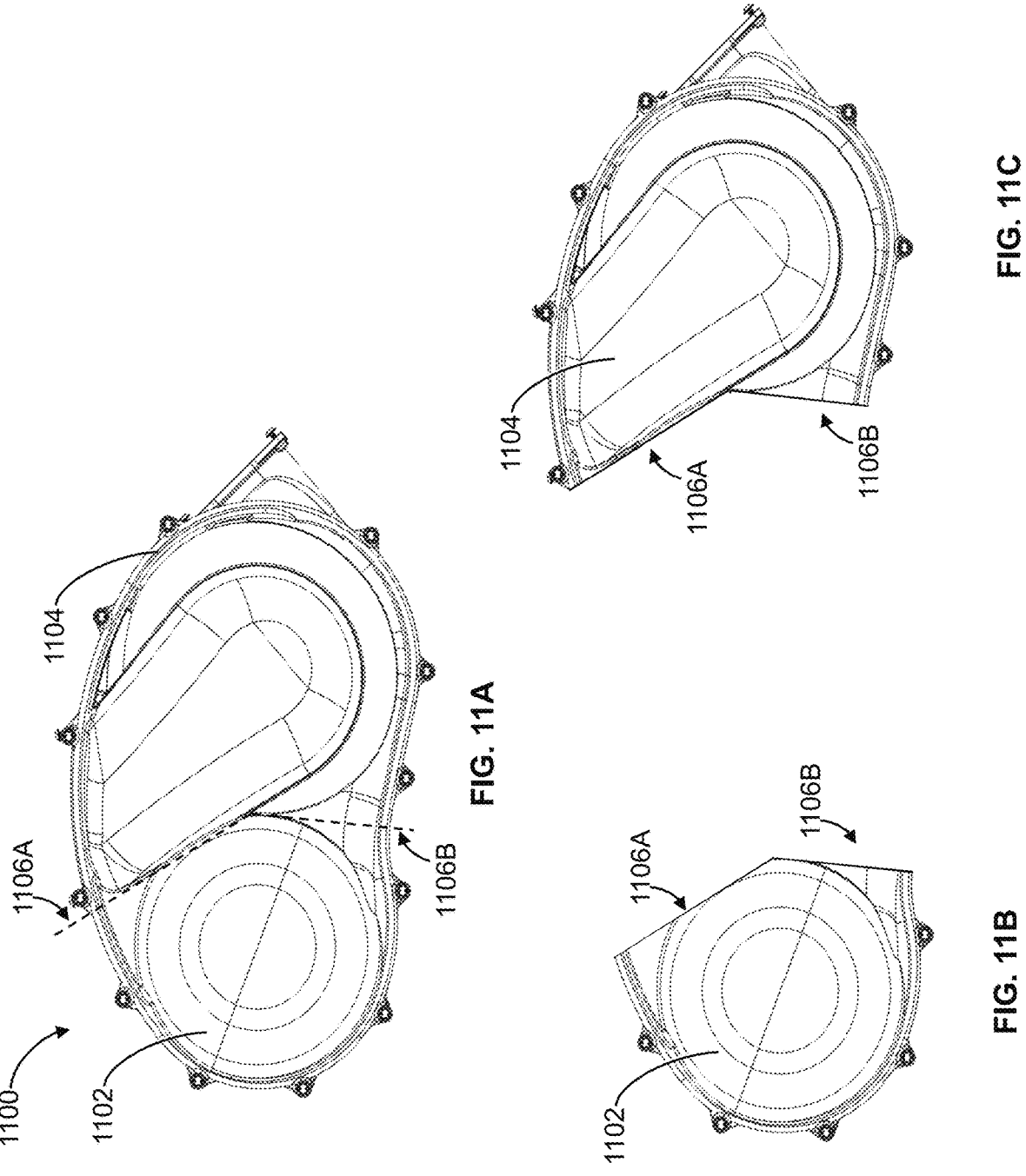
FIGS. 11A through 11C are conceptual diagrams illustrating an example CVT cover having two components configured to facilitate cover removal.

FIGS. 11A through 11C are conceptual diagrams illustrating an example CVT cover 1100 having two components configured to facilitate cover removal for improve serviceability and reduce design space-claim compared to single piece CVT covers. In some examples, cover 1100 includes a forward component 1102 and a rearward component 1104. Although described as including two components, on other examples, cover 1100 may include more than two components, such as three, four, five, or more components.

Each component, e.g., forward component 1102 and rearward component 1104 as coupled along a hinge extending along a first plane indicated by dashed line 1106A and a second plane indicated by dashed line 1106B (collectively, planes 1106). Planes 1106 are positioned to approximately follow a contour of cover 1100 for ease of manufacturing and to provide a robust hinge. A material of cover 1100 along planes 1106 may be thickened relative to adjacent portion of cover 1100 to provide for a hinge system.

The hinge system may include any suitable type of hinge, mechanical coupling, or a combination thereof. For example, the hinge system may include at least one first segment, e.g., extending along first plane 1106A that includes a mechanical coupling having male mating portions on forward component 1102 and corresponding female mating portions of rearward component 1104. Additionally, or alternatively, the at least one first segment may be securable with removeable fasteners such as screws, bolts, or clips. The hinge system also may include at least one second segment, e.g., extending along second plane 1106B that includes a mechanical coupling as described above or, alternatively, a living hinge. By including a living having along the at least one second segment, forward component 1102 and rearward component 1104 may remain physically coupled during an installation or removal process, while enabling cover 110 to be bent or otherwise manipulated to facilitate the installation or removal process. In other examples, first component 1102 and second component 1104 may be completely separable as illustrated in FIGS. 11B and 11C. In some examples, the hinge system may include a seal, such as a rubber gasket optionally coupled or adhered to a groove, and configured to substantially seal the hinge from debris intrusion, cooling air loss, or the like. In these ways, cover 1100 may facilitate serviceability by enabling removal of individual pieces that may traverse a smaller clearance gap relative to one piece covers and provide more flexibility in sequence and approach during installation processes.

Figures 12A, 12B:
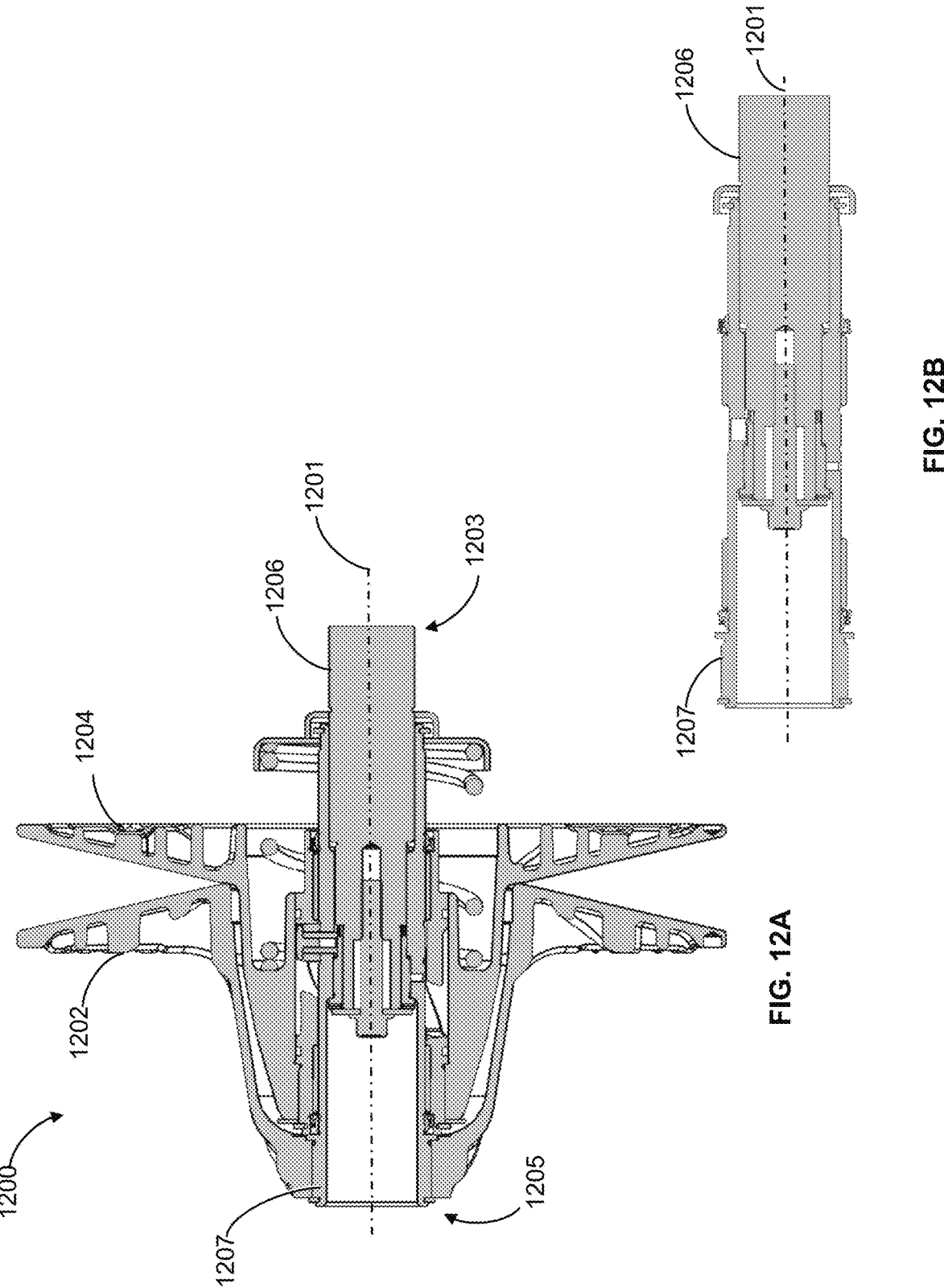
FIGS. 12A and 12B are conceptual diagrams illustrating an example driven clutch.

FIGS. 12A and 12B are conceptual diagrams illustrating cross-sectional view of an example driven clutch 1200. Driven clutch 1200 is the same or substantially similar to driven clutch 200 described above in reference to FIGS. 2A through 2G, except for the differences described herein. For example, driven clutch 1200 includes a stationary sheave 1202 and a movable sheave 1204 which are mechanically coupled to an input shaft 1206 extending along a drive axis 1201 from a proximal end 1203 to a distal end 1205. Unlike, drive clutch 200, stationary sheave 1202 is fixed to a stationary shaft 1207 that is coupled to post 1206 and movable sheave 1204 may be retained on post 1206 in a sliding engagement. Stationary shaft 1207 includes a unitary shaft coupling input shaft 1206 to stationary sheave 1202. By using unitary stationary shaft 1207, driven clutch 1200 may provide a more robust system relative to clutch designs that include two or more coupled components to transmit torque from the input shaft to the stationary sheave.

The following clauses illustrate example subject matter described herein.

Clause 1: A driven unit helix assembly for a continuously variable transmission, comprising: a roller sleeve comprising a hollow cylinder extending along a drive axis from a distal end to a proximal end, wherein the roller sleeve defines an aperture configured to receive in sliding engagement at least a portion of a post extending along a drive axis, wherein a distal portion of the roller sleeve is configured to couple to a distal portion of a movable sheave; a plurality of roller assemblies, each respective roller assembly including a roller post extending radially outward from a first end coupled to a respective portion of the roller sleeve to a second end coupled to a roller; a helix comprising a sidewall extending circumferentially around and coupled in an axial sliding engagement to at least a portion of the roller sleeve, the sidewall defining a plurality of roller tracks, wherein each respective roller track is configured to receive in a sliding engagement the roller of a respective roller assembly; a spring extending from a proximal end coupled to a proximal portion of the helix to a distal end configured to contact at least a portion of the distal portion of the movable sheave; and a helix sleeve extending circumferentially around the helix, wherein the helix sleeve is configured to retain a fluid in the helix assembly.

Clause 2: The driven unit helix assembly of clause 1, wherein the post is configured to couple to an input shaft of a gear box, wherein the roller sleeve is configured to circumferentially surround and couple to at least the portion of the post between a proximal end and a distal end of the post.

Clause 3: The driven unit helix assembly of clause 1 or 2, wherein the plurality of roller assemblies comprises at least five roller assemblies.

Clause 4: The driven unit helix assembly of any one of clauses 1 through 3, wherein each respective roller comprises at least one of a bearing and a polymeric slider.

Clause 5: The driven unit helix assembly of any one of clauses 1 through 5, wherein the sidewall defines the plurality of roller tracks, each respective roller track defined by portions of the sidewall tapered relative to a plane extending normal to an exterior surface of the sidewall.

Clause 6: The driven unit helix assembly of any one of clauses 1 through 5, wherein the sidewall defines the plurality of roller tracks extending at an angle between about 30-degrees and about 80-degrees relative to the drive axis.

Clause 7: The driven unit helix assembly of any one of clauses 1 through 6, wherein each roller track of the plurality of roller tracks define a first portion extending at first angle relative to the drive axis and a second portion extending at a second angle relative to the drive axis.

Clause 8: The driven unit helix assembly of any one of clauses 1 through 7, wherein each roller track of the plurality of roller tracks define an engine-brake section.

Clause 9: The driven unit helix assembly of any one of clauses 1 through 8, further comprising a spring cup extending radially from an inner portion coupled to a proximal portion of the helix to an outer portion defining an axially extending lip, wherein the proximal portion of the spring is coupled to the spring cup.

Clause 10: The driven unit helix assembly of any one of clauses 1 through 9, further comprising: a first static seal coupled to a distal portion of the helix; and a second static seal coupled to the proximal portion of the helix, wherein the helix sleeve extends axially from at least the distal circumferential recess to the proximal circumferential, and wherein a radially exteriors surface of the first static seal and the second static seal are configured to engage a radially interior surface of the helix sleeve to retain the fluid in the helix assembly.

Clause 11: The driven unit helix assembly of any one of clauses 1 through 10, further comprising: a first dynamic seal coupled to the distal portion of the roller sleeve and configured to seal in sliding engagement against the post; and a second dynamic seal coupled to a distal portion of the helix and configured to seal in sliding engagement against the roller sleeve.

Clause 12: The driven unit helix assembly of any one of clauses 1 through 11, further comprising a static seal coupled to a proximal portion of the helix and configured to seal against the post.

Clause 13. The driven unit helix assembly of any one of clauses 1 through 12, wherein the spring is configured to apply a spring force urging the movable sheave toward a stationary sheave.

Clause 14: The driven unit helix assembly of any one of clauses 1 through 13, wherein each respective roller track extends from a proximal end to a distal end, wherein the helix is movable relative to the roller sleeve from a first position in which the plurality of roller assemblies are axial adjacent the proximal end of the plurality of roller tracks to a second position in which the plurality of roller assemblies are axial adjacent the distal end of the plurality of roller tracks, wherein when in the first position, a first void volume is defined between a radially exterior surface of the post and a radially interior surface of each of the roller sleeve, the helix, and the helix sleeve.

Clause 15: The driven unit helix assembly of clause 14, wherein when in the second position, a second void volume is defined between a radially exterior surface of the post and a radially interior surface of each of the roller sleeve, the helix, and the helix sleeve, and wherein the second void volume is greater than at least 50% of the first void volume.

Clause 16: A driven unit for a continuously variable transmission, comprising: a post extending along a drive axis from a proximal end to a distal end; an stationary sheave extending from a distal portion coupled to a distal portion of the post to a proximal portion defining a first belt contact surface and a first plurality of fins; a helix assembly comprising: a roller sleeve circumferentially surrounding and coupled to at least a portion of the post between the proximal end and the distal end of the post; a plurality of roller assemblies each including a roller post extending radially outward from a proximal end coupled to the roller sleeve to a distal end coupled to a roller; a helix comprising a sidewall extending circumferentially around and coupled in an axial sliding engagement to at least a portion of the roller sleeve, the sidewall defining a plurality of roller tracks, wherein each respective roller track is configured to receive in a sliding engagement a respective roller, a spring cup extending radially from an inner portion coupled to a proximal portion of the helix to an outer portion defining an axially extending lip; a spring extending from a proximal end coupled to the spring cup to a distal end; a helix sleeve extending circumferentially around the helix, wherein the helix sleeve is configured to retain a fluid in the helix assembly; and a movable sheave extending axially from a distal portion coupled in sliding engagement to the roller sleeve to a proximal portion defining a second belt contact surface and a second plurality of fins, wherein the distal end of the spring contacts at least a portion of the distal portion of the movable sheave and is configured to apply a spring force urging the movable sheave toward the stationary sheave, wherein a medial portion of the movable sheave defines a cavity configured to receive therein at least a portion of the helix assembly.

Clause 17: The driven unit of clause 16, wherein the helix assembly comprises any one of the driven unit helix assemblies of clauses 1 through 15.

Clause 18: The driven unit of clause 16 or 17, wherein a medial portion of the stationary sheave defines a cavity configured to receive therein at least a portion of the distal portion of the movable sheave.

Clause 19: The driven unit of any one of clauses 16 through 18, wherein the stationary sheave defines a female spline portion configured to receive therein a male spline portion defined by the post, wherein the female spline portion defines proximal first journal region, a distal second journal region, and a spline torque transmitting region disposed between the first journal region and the second journal region.

Clause 20: The driven unit of any one of clauses 16 through 19, wherein a diameter of the first journal is approximately equal to a diameter of the spline major diameter of the male spline portion and a diameter of the second journal is approximately equal to a diameter of the spline minor diameter of the male spline portion.

Clause 21: The driven unit of any one of clauses 16 through 20, wherein at least one of the first belt contact surface and the second belt contact surface comprise a wear-resistant layer.

Clause 22: The driven unit of clause 21, wherein the wear-resistant layer comprises at least one of electroless nickel, tungsten carbide, and a hard-coat oxidation layer.

Clause 23: The driven unit of any one of clauses 16 through 22, further comprising a stationary sheave windage plate comprising: a radially extending annulus coupled to a distal surface of the stationary sheave; and a deflector portion defining a curved transition from the radially extending annulus to an axially extending distal edge.

Clause 24: The driven unit of any one of clauses 16 through 23, further comprising a movable sheave windage plate comprising: a radially extending annulus coupled to a proximal surface of the movable sheave; and a deflector portion defining a curved transition from the radially extending annulus to an axially extending proximal edge.

Clause 25: The driven unit of any one of clauses 16 through 23, further comprising an enclosure defining an air inlet having two separate ports, the enclosure having at least one baffle configured to separate a first airflow path of the driven unit from a second airflow path of a drive unit.

Clause 26: The driven unit of clause 25, wherein the enclosure further comprises at least one shield integrated with at least one of an inboard cover or an outboard cover of the enclosure.

Clause 26: The driven unit of clause 25 or 26, wherein the enclosure comprises an outboard cover, wherein the outboard cover comprises at least a forward component and a rearward component, and wherein the forward component is removably couplable to the rearward component along a hinge extending along a first plane and a second, different plane.

Various directional terms and expressions herein are derived from the r-θ-z coordinate system depicted in FIG. 3. The r-θ-z coordinate system is of arbitrary origin, with the z-coordinate being colinear with a drive axis, e.g., drive axis 201. "Axial" and its derivative terms refer to directions that are parallel to the z-coordinate. "Radial" and its derivative terms refer to directions parallel to the r-coordinate. "Tangential" and its derivative terms refer to a direction that is congruent with the θ-coordinate. "Distal" and its derivative terms refers to a direction along the z-coordinate that is away from the base of post 206 toward fastener 208. "Proximal" and its derivative terms refer to a direction that is opposite the distal direction.

While the disclosure has been described in connection with what is presently considered to be the most practical and preferred embodiments, it is to be understood that the disclosure is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A driven unit helix assembly for a continuously variable transmission, comprising:
   a roller sleeve comprising a hollow cylinder extending along a drive axis from a distal end to a proximal end, wherein the roller sleeve defines an aperture configured to receive in sliding engagement at least a portion of a post extending along the drive axis, wherein a distal portion of the roller sleeve is configured to couple to a distal portion of a movable sheave;
   a plurality of roller assemblies, each respective roller assembly including a roller post extending radially outward from a first end coupled to a respective portion of the roller sleeve to a second end coupled to a roller;
   a helix comprising a sidewall extending circumferentially around and coupled in an axial sliding engagement to at least a portion of the roller sleeve, the sidewall defining a plurality of roller tracks, wherein each respective roller track is configured to receive in a sliding engagement the roller of a respective roller assembly;
   a spring extending from a proximal end coupled to a proximal portion of the helix to a distal end configured to contact at least a portion of the distal portion of the movable sheave; and
   a helix sleeve extending circumferentially around the helix, wherein the helix sleeve is configured to retain a fluid in the helix assembly.

2. The driven unit helix assembly of claim 1, wherein the post is configured to couple to an input shaft of a gear box, and wherein the roller sleeve is configured to circumferentially surround and couple to at least the portion of the post between a proximal end and a distal end of the post.

3. The driven unit helix assembly of claim 1, wherein the plurality of roller assemblies comprises at least five roller assemblies, and wherein each respective roller comprises at least one of a bearing and a polymeric slider.

4. The driven unit helix assembly of claim 1, wherein the sidewall defines the plurality of roller tracks extending at an angle between about 0-degrees and about 45-degrees relative to the drive axis, each respective roller track defined by portions of the sidewall tapered relative to a plane extending normal to an exterior surface of the sidewall.

5. The driven unit helix assembly of claim 1, wherein each roller track of the plurality of roller tracks defines a first portion extending at a first angle relative to the drive axis and a second portion extending at a second angle relative to the drive axis.

6. The driven unit helix assembly of claim 1, wherein each roller track of the plurality of roller tracks defines an engine-brake section.

7. The driven unit helix assembly of claim 1, further comprising a spring cup extending radially from an inner portion coupled to a proximal portion of the helix to an outer portion defining an axially extending lip, wherein the proximal portion of the spring is coupled to the spring cup.

8. The driven unit helix assembly of claim 1, further comprising:
   a first static seal coupled to a distal portion of the helix; and
   a second static seal coupled to the proximal portion of the helix,
   wherein the helix sleeve extends axially from at least a distal circumferential recess to a proximal circumferential recess, and wherein a radially exterior surface of the first static seal and the second static seal are configured to engage a radially interior surface of the helix sleeve to retain the fluid in the helix assembly.

9. The driven unit helix assembly of claim 1, further comprising:
   a first dynamic seal coupled to the distal portion of the roller sleeve and configured to seal in sliding engagement against the post; and
   a second dynamic seal coupled to a distal portion of the helix and configured to seal in sliding engagement against the roller sleeve.

10. The driven unit helix assembly of claim 1, further comprising a static seal coupled to a proximal portion of the helix and configured to seal against the post.

11. The driven unit helix assembly of claim 1, wherein each respective roller track extends from a proximal end to a distal end, wherein the helix is movable relative to the roller sleeve from a first position in which the plurality of roller assemblies are axially adjacent the proximal end of the plurality of roller tracks to a second position in which the plurality of roller assemblies are axially adjacent the distal end of the plurality of roller tracks, wherein when in the first position, a first void volume is defined between a radially exterior surface of the post and a radially interior surface of each of the roller sleeve, the helix, and the helix sleeve.

12. The driven unit helix assembly of claim 11, wherein when in the second position, a second void volume is defined between a radially exterior surface of the post and a radially interior surface of each of the roller sleeve, the helix, and the helix sleeve, and wherein the second void volume is greater than at least 50% of the first void volume.

13. A driven unit for a continuously variable transmission, comprising:
   a post extending along a drive axis from a proximal end to a distal end;
   a stationary sheave extending from a distal portion coupled to a distal portion of the post to a proximal portion defining a first belt contact surface and a first plurality of fins;
   a helix assembly comprising:
   a roller sleeve circumferentially surrounding and coupled to at least a portion of the post between the proximal end and the distal end of the post;
   a plurality of roller assemblies each including a roller post extending radially outward from a proximal end coupled to the roller sleeve to a distal end coupled to a roller;
   a helix comprising a sidewall extending circumferentially around and coupled in an axial sliding engagement to at least a portion of the roller sleeve, the sidewall defining a plurality of roller tracks, wherein each respective roller track is configured to receive in a sliding engagement a respective roller,
   a spring cup extending radially from an inner portion coupled to a proximal portion of the helix to an outer portion defining an axially extending lip;
   a spring extending from a proximal end coupled to the spring cup to a distal end;

a helix sleeve extending circumferentially around the helix, wherein the helix sleeve is configured to retain a fluid in the helix assembly; and a movable sheave extending axially from a distal portion coupled in sliding engagement to the roller sleeve to a proximal portion defining a second belt contact surface and a second plurality of fins, wherein the distal end of the spring contacts at least a portion of the distal portion of the movable sheave and is configured to apply a spring force urging the movable sheave toward the stationary sheave, wherein a medial portion of the movable sheave defines a cavity configured to receive therein at least a portion of the helix assembly.

14. The driven unit of claim 13, wherein the stationary sheave defines a female spline portion configured to receive therein a male spline portion defined by the post, and wherein the female spline portion defines a proximal first journal region, a distal second journal region, and a spline torque transmitting region disposed between the proximal first journal region and the distal second journal region.

15. The driven unit of claim 14, wherein a diameter of the proximal first journal region is approximately equal to a diameter of a spline major diameter of the male spline portion and a diameter of the distal second journal region is approximately equal to a diameter of a spline minor diameter of the male spline portion.

16. The driven unit of claim 13, wherein at least one of the first belt contact surface and the second belt contact surface comprise a wear-resistant layer comprising at least one of electroless nickel, tungsten carbide, and a hard-coat oxidation layer.

17. The driven unit of claim 13, further comprising:

a stationary sheave windage plate comprising:

a radially extending annulus coupled to a distal surface of the stationary sheave; and a deflector portion defining a curved transition from the radially extending annulus to an axially extending distal edge; and a movable sheave windage plate comprising:

a radially extending annulus coupled to a proximal surface of the movable sheave; and a deflector portion defining a curved transition from the radially extending annulus to an axially extending proximal edge.

18. The driven unit of claim 13, further comprising an enclosure defining an air inlet having two separate ports, the enclosure having at least one baffle configured to separate a first airflow path of the driven unit from a second airflow path of a drive unit.

19. The driven unit of claim 18, wherein the enclosure further comprises at least one shield integrated with at least one of an inboard cover or an outboard cover of the enclosure.

20. The driven unit of claim 18, wherein the enclosure comprises an outboard cover, wherein the outboard cover comprises at least a forward component and a rearward component, and wherein the forward component is removably couplable to the rearward component along a hinge extending along a first plane and a second, different plane.

* * * * *